US006962668B2

(12) United States Patent
Medower et al.

(10) Patent No.: US 6,962,668 B2
(45) Date of Patent: Nov. 8, 2005

(54) DOUBLE-SIDED DIGITAL OPTICAL DISK AND METHOD AND APPARATUS FOR MAKING

(75) Inventors: Brian S. Medower, Boulder, CO (US); Michael F. Braitberg, Boulder, CO (US); David H. Davies, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 288 days.

(21) Appl. No.: 10/290,116

(22) Filed: Nov. 6, 2002

(65) Prior Publication Data

US 2003/0152018 A1 Aug. 14, 2003

Related U.S. Application Data

(63) Continuation of application No. 09/652,975, filed on Aug. 31, 2000, now abandoned.

(51) Int. Cl.⁷ .............................................. B29D 11/00
(52) U.S. Cl. ...................................... 264/1.33; 264/2.5
(58) Field of Search ................................ 264/1.33, 2.5, 264/40.1, 106, 107; 425/810

(56) References Cited

U.S. PATENT DOCUMENTS

| | | | |
|---|---|---|---|
| 4,126,726 A | 11/1978 | Soeding | 264/1.33 |
| 5,787,460 A | 7/1998 | Yashiro et al. | 711/114 |
| 5,931,935 A | 8/1999 | Cabrera et al. | 710/260 |
| 6,159,572 A | 12/2000 | Kobayashi et al. | |
| 6,210,609 B1 | 4/2001 | Takeda et al. | 264/1.33 |
| 6,325,950 B1 | 12/2001 | Hosokawa et al. | 264/1.33 |

FOREIGN PATENT DOCUMENTS

| | | |
|---|---|---|
| JP | 05 028488 | 2/1993 |
| JP | 07 100866 | 4/1995 |
| JP | 08 287461 | 11/1996 |
| JP | 09 029789 | 2/1997 |
| JP | 10 106049 | 4/1998 |
| JP | 11 296904 | 10/1999 |

OTHER PUBLICATIONS

SHR3000 Robot datasheet from the JEL Company of Hiroshima, Japan (1 page).

IBM Corporation, Directory Maintenance VM/ESA: Diagnosis Reference, Release 5.0, Jul. 1999, p. 104.

*Primary Examiner*—Mathieu D. Vargot
(74) *Attorney, Agent, or Firm*—MacPherson, Kwok, Chen & Heid LLP

(57) ABSTRACT

A digital optical information disk contains content and/or non-content information on both sides of a single substrate produced by a process that embosses the surfaces of both sides substantially simultaneously. Simultaneous molding substantially eliminates the need for lamination when two or more data layers are to be provided. Preferably, the disk is relatively small, such as less than 50 mm in diameter and can replicate marks or features with a z-dimension magnitude of about 80 mm or more. The disk remains within a specified opto-mechanical range of an optical transducer and has little, if any, non-planarity (warp) or other distortion. The disk can be used for reading pre-written or mastered content, e.g., in a user's device, and/or can include information or features that permits or supports utility functions, allowing the user to record data thereon such as tracking, sector, location, timing, synchronization features or combinations thereof. Preferably, the disk is formed by an injection-only technique, although it is possible to provide suitable disks by an injection-compression technique as well.

18 Claims, 16 Drawing Sheets

Initial Injection Stage

Compression Stage

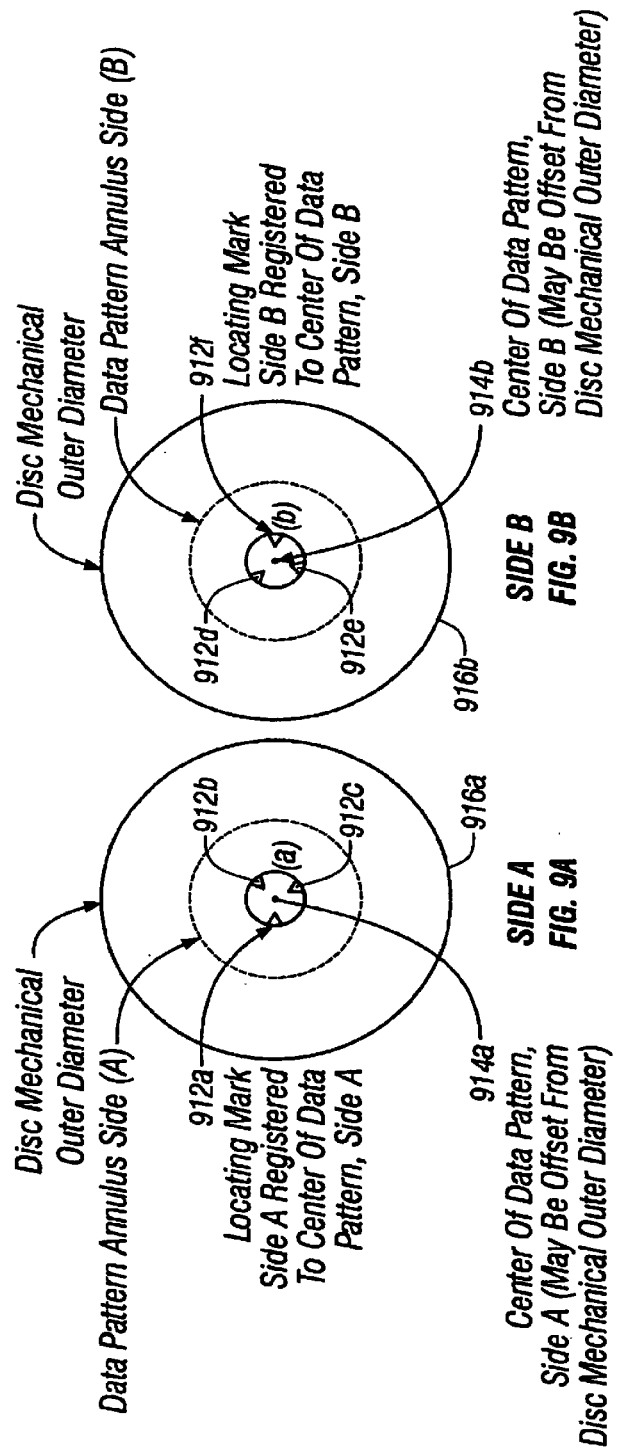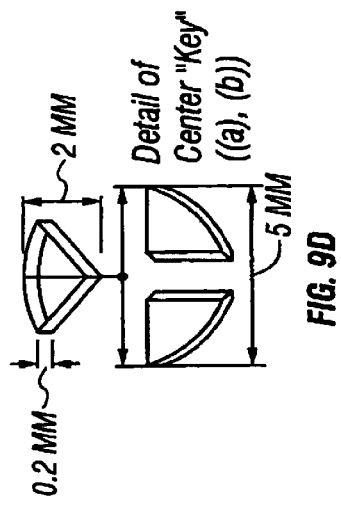
SIDE B
FIG. 9B
SIDE A
FIG. 9A
FIG. 9D
Detail of Center "Key" ((a), (b))

DOUBLE-SIDED DIGITAL OPTICAL DISK AND METHOD AND APPARATUS FOR MAKING

This application is a continuation of U.S. patent application Ser. No. 09/652,975, filed Aug. 31, 2000, entitled "Double-Sided Digital Optical Disk And Method And Apparatus For Making", now abandoned.

Cross-reference is made to U.S. patent application Ser. No. 09/315,398, filed May 20, 1999, entitled "Removable Optical Storage Device and System," U.S. Provisional Application No. 60/140,633, filed Jun. 23, 1999, entitled "Combination Mastered and Writeable Medium and Use in Electronic Book Internet Appliance," U.S. patent application Ser. No. 09/393,899, filed Sep. 10, 1999, entitled "Content Distribution Method and Apparatus," U.S. patent application Ser. No. 09/393,150, filed Sep. 10, 1999, entitled "Writeable Medium Access Control Using a Medium Writeable Area," U.S. patent application Ser. No. 09/457,104 filed Dec. 7, 1999, entitled "Low Profile Optical Head," U.S. patent application Ser. No. 09/560,781, filed Apr. 28, 2000, entitled "Miniature Optical Disk for Data Storage," and U.S. patent application Ser. No. 09/57,284, filed Apr. 24, 2000, entitled "Tilt Focus Method and Mechanism for an Optical Drive," all of which are incorporated herein by reference.

The present invention is directed to a disk having optically readable digital information on both sides and in particular to a disk in which at least some optically readable marks are embossed, or otherwise provided, substantially simultaneously on both sides.

BACKGROUND INFORMATION

A number of technologies have been developed or proposed for storing optically readable information on a rotatable disk. Recent efforts have concentrated on devices in which digital (non-analog) information is stored on a disk having a diameter of about 120 mm, such as a "compact disk" (CD) or a "digital versatile disk" (DVD). A number of forms of such disks have been proposed. For example, some DVD-style disks include two information layers. In some approaches, a read beam always (initially) impinges the same side of the disk (e.g., being focused on either the upper data layer or lower data layer). In other approaches that have been proposed, the read beam initially impinges a first side when a first data layer is read and initially impinges the second side when the second data layer is to be read.

With respect to optical media types, one classification relates to their read and/or write capabilities or functions relative to information content portions of the medium. The information content portions can be generally characterized as that part of the optical medium that information is read from and/or written to. The information content portions are often, but need not be, a composite film layer comprised of two or more layers of thin films on which information is recorded (written) and/or from which information is obtained (read). According to this, optical media, or any portion thereof, can be classified as: read-only, write-once, and rewriteable. A read-only optical medium refers to a medium in which data or other information is only read from the optical medium under control of the consumer or user thereof. There is no writing or recording by the user, after the read-only optical medium has been produced or manufactured. The write-once optical medium, or any portion thereof, refers to a medium or portion thereof in which the consumer or user is able to control the recording or writing information only once on the optical medium or portion thereof. After the write-once optical medium or portion thereof has information recorded thereon by the user, the write-once optical medium is not to be written to again. That is, if a portion of the medium has been written to in which a mark is provided thereon, that portion cannot be written to again, although any other portion that does not have a mark, could be written to. In one embodiment, at least the information content portions of the write-once optical medium can have an amorphous structure or state before recording. As part of the recording operation, the amorphous structure of the information content portions is transformed into a crystalline structure having the stored information. In one embodiment, the information layer of the write-once optical medium could also be comprised of dye-based or, alternatively, ablative materials. The rewriteable optical medium refers to a medium in which the information content portions may have information recorded thereon many times; in some cases, essentially without limit where the medium can be erased or over-written a substantial number of cycles and, in other cases, there is a finite limit where phase transition materials constitute the material structure of the medium.

With respect to a read-only optical medium, the read-only information can be provided thereon by injection molding, which results in pits or bumps being recorded as the information content portions. These indicia are indicative of recorded data or other information. Although injection molding may be preferred, it is only one form of creating bumps or pits (generically referred to herein as embossing). With respect to writeable (write-once, and, rewriteable) optical media, grooves are typically formed in their substrates. The grooves are utilized in locating proper positions for information to be recorded. Such information is typically recorded in the form of marks and spaces, which are indicative of binary information. The marks and spaces are distinguished from each other by their different reflectivities and/or optical phase.

In accordance with known and prior art practice, each of the above-defined optical media can be further characterized as being second-surface media. In accordance with one definition, second-surface optical media can be defined in terms of the read operation that is conducted when reading information from the media. In particular, a second-surface optical medium can refer to a medium in which the read beam is incident on the substrate of the optical medium or disk before it is incident on the information layer.

Such second-surface (or other non-first-surface disks), while of commercial use, at least in the context of present commercial readers, are associated with certain technical issues or disadvantages including potential for energy loss in the substrate, beam distortion (such as that associated with beam tilt, coma, and the like) and, effectively, relatively large mark sizes (which affects data densities).

The relatively thick and transparent substrate of second-surface optical media makes read-only or read-write operations relatively insensitive to dust particles, scratches and the like which are located more than 50 wavelengths from the information layer. On the other hand, the second-surface optical medium can be relatively sensitive to various opto-mechanical variations. For example, common opto-mechanical variations include: (1) tilt of the substrate relative to the optical axis; (2) substrate thickness variations; and/or (3) substrate birefringence.

These variations give rise to optical aberrations which degrade system performance arising from the presence of the thick transparent layer and which can, at least theoretically, be partially compensated for by using a suitable optical path design. Such an optical path typically can only provide compensation for a single, pre-defined thickness of the layer. Because there are likely to be variations in the thickness or other properties of the transparent layer, such compensation may be less than desired at some locations of the medium.

Because the transparent layer is typically formed from a non-conductive material, there is a further risk that rotation or similar movement of the medium will create sufficient static electrical charge that dust particles or other debris may be attracted to and may adhere to the operational surface of the medium.

Another drawback associated with second-surface optical media is that the optical requirements of such media are substantially inconsistent with the miniaturization of the disk drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the recording layer. To provide the longer working distance, larger optical components (e.g., objective lens) are required. Accordingly, it would be useful to provide a digital optical disk having more than one data layer which can avoid some or all of the issues associated with non-first surface data layers.

A major contributor to on-track error rates in optical disk drive reading and writing is the improper positioning of the optical head relative to track location on the rotating disk. A "track" is a portion of the spiral or concentric data track of a typical optical disk which follows the spiral or circle for one rotation of the disk. For example, misalignment of the objective lens relative to the center of the track can cause the optical head to read information from and/or write information onto adjacent tracks and attempt to read in inter-track regions. The resulting noise can reduce the signal-to-noise ratio, leading to increased error rates. This can be caused by non-concentricity of the radial tracks on the disk relative to a reference or a point on the disk drive, such as an axis of disk rotation. Non-concentricity or runout can result from the disk and/or tracks being positioned off-center in the disk drive and/or improper vertical alignment of the plane of the disk relative to the disk drive. Non-concentricity can be viewed as potentially arising from a number of sources, each contributing toward a "budget" of maximum tolerable non-concentricity. Among the sources, contributing to the budget in previous laminated disk approaches, are the non-concentricity in the data layer of each half-disk (created during molding processes) with respect to the center of the central hole of the disk (which at least partially defines the axis of disk rotation, in previous CD and DVD devices), magnitude and direction of any inaccuracies in alignment of the two half-disks (during the lamination process), concentricity tolerances in the position of the disk with respect to the drive spindle, and run-out or non-concentricities in the spindle (e.g. arising from a bent spindle shaft or the like). Only some of these sources are affected by the disk fabrication process, and accordingly it would be useful to provide a system, method and apparatus for fabricating disks which can reduce non-concentricity arising within the disk fabrication process to a level sufficiently low that, combined with anticipated typical values of non-concentricity contributions from other sources, yields a total non-concentricity budget which keeps data error rates (or at least that portion arising from effects of non-concentricity) within tolerable limits. It is also important to provide a high degree of concentricity on a repeatable basis. Accordingly, it would be useful to provide a method for decreasing the degree of non-concentricity of the tracks relative to the disk drive and additionally a method for reducing vertical misalignment of the disk relative to the disk drive.

In at least some approaches for providing two data layers in a disk, including approaches commonly used for commercial production of DVDs, two substrate halves, each containing one data layer, are produced separately (such as on different machines or production lines and/or at different times) and the two halves are subsequently laminated together. A number of difficulties or problems are associated with lamination of substrate halves. Press setups can be relatively time-and/or labor-intensive, and typically must be performed separately for each disk half. A number of process steps are required to perform the lamination. It can be difficult and/or expensive to provide for desired balance and/or concentricity of the disk data layers, perimeters, central holes and the like. Lamination procedures can provide a certain percentage of disks which have (or develop) an unacceptable amount of warp or non-planarity. Use of a lamination approach can mean that a certain percentage of disks may become delaminated rendering them unuseable, and potentially causing damage to readers or other equipment. Accordingly, it would be useful to provide a system method and apparatus which can achieve digital optical disks that provide more than one data layer in the absence of lamination.

Furthermore, in addition to disadvantages associated with lamination per se, previous processes which required two separate operations for forming a disk with two data layers are associated with a number of inefficiencies such as substantially larger amounts of time and effort, typically requiring highly skilled labor and/or specialized equipment for press or other equipment setup, as well as for the fabrication process itself. Accordingly, it would be useful to provide a system, method and apparatus for forming digital optical disks which can form two data layers in a single process or step, such as forming two data layers substantially simultaneously.

Although numerous analog information disk production techniques have been developed, extending as far back as gramophone or phonograph production, in general these techniques and materials are unsuitable for digital optical information which generally requires accurate replication of very small features or marks. Accordingly, it would be useful to provide a system, method and apparatus for double-sided embossing of a digital optical disk which can reliably replicate features which are very small in dimensions parallel to the plane 1302 (FIGS. 13A, B, C) of the optical disk 1304 surface, yet have substantial (although still small) magnitude in the "z" dimension 1306 (perpendicular to the plane of the optical disk surface), such as providing features on the disk having a maximum trackwise 1308 size 1312 of about 550 nanometers (nm) or less, a radial dimension 1310 size 1314a,b of about 220–400 nm or less and a z-dimension magnitude 1316a,b (regardless of whether the feature is a bump 1318, a pit 1322 or some other shape) of about 80 nm or more (e g. when using light at a wavelength of about 650 micrometers).

SUMMARY OF THE INVENTION

The present invention includes a recognition of certain problems in previous approaches, including as described herein. The present invention includes a recognition that use of a first surface medium permits both data layers to be embossed at the same time, in a single process (because there is no need to substantially bury or sandwich data layers under or between substrate material). By eliminating the need for a lamination process, use of first surface media eliminates the contribution of the lamination process towards the total non-concentricity budget, making it feasible to achieve relatively small non-concentricity goals in a regularly reproducible manner.

In one aspect, the invention involves embossing or molding optically-readable marks substantially simultaneously on both sides of a disk. In one embodiment, first and second stampers are positioned on first and second opposed, movable press surfaces. In one embodiment the stampers are provided using a reverse mastering approach, which relates to the use of stampers which produce features that protrude from the major surface of the optical disk (i.e. bumps), which features correspond to the features formed in the surface of the original master disk. The stampers are moved or positioned to provide concentricity (or other positioning), within desired tolerance, of the (preferably annular) region or pattern of marks. In one embodiment, a test press is inspected and/or measured as a basis for repositioning stampers to improve positioning. Adjustment may be iterated until acceptable results are obtained (such as achieving a "best fit" and/or sufficiently low departures, from perfect positioning of data areas or patterns, disk edges, central hole positions and the like). In one embodiment each stamper should be positioned to provide less than a 10 micrometer difference between the center of the data pattern or region and the center of the disk (e.g. based on perimeter position, or central hole or hub position, either actual or as indicated by, e g. fiduciary marks).

After acceptable positioning has been achieved, production can commence. During production pressing, a molding material, such as a polycarbonate-based (or other) material is injected into the area between the stampers. In one embodiment, injection is accompanied by, or followed by, compression (of the space between the stampers), e.g., to assist in replicating the small marks on the stampers. In another embodiment, a pure injection process is used (i e., substantially without compression). In at least some embodiments, the disk is sufficiently small (such as less than 120 mm, preferably less than about 50 mm, more preferably about 32 mm in diameter) that the molding material can travel from the (typically centrally located) injection port to the portion of this farthest from the injection port (typically at the disk rim) before the molding material cools, or otherwise increases in viscosity, to the point that can no longer effectively flow around, and accurately replicate, the small stamper marks.

After the mold material has sufficiently hardened, the mold is opened and the disk is removed from the mold, bearing digital, optically readable marks, replicated from the two stampers, on each of its first and second surfaces.

A number of post-molding steps can be performed. A center hole may be cut or trimmed, such as to remove a molding sprue and/or to accommodate a hub or spindle. A hub or hub components may be attached to the disk. In some embodiments, positioning of the hub or hub components can be used to fully or partially achieve desired concentricity. One or both surfaces of the disk may be coated In at least some embodiments, the disk will be substantially permanently encased in a protective cartridge.

In the preferred embodiment, the optical medium is a first-surface medium. Although it may be subject to more than one definition, in one embodiment, the first-surface optical medium refers to a medium in which the read beam during a read operation is incident on or impinges on information content portions of the first-surface optical medium before it impinges on a substrate of the first-surface optical medium. The "information content portions" can be defined as portions of the optical medium that store or contain servo data, address data, clock data, user data, system data, as well as any other information that is provided on the optical medium. The "information content portions" can be integral with the substrate such as the case of a read-only medium. The information content portions can also be separately provided. In such a case, the information content portions can be, for example, an information layer of a writeable medium.

In one additional or alternative definition, the first-surface optical medium can refer to an optical medium having a tangible thickness in which a read light beam during a read operation traverses less than 100 micrometers of this thickness before impinging on the information content portions.

In one embodiment, the "substrate" can be defined as an optical medium layer that is at least 100 micrometers (0.1 mm) in thickness. Alternatively or additionally, the substrate can also be defined as being an optical medium layer that is contiguous with the information layer. Alternatively or additionally, the substrate can also be defined as being greater in thickness than any other layer of the optical medium that has a substantially homogenous composition. In those cases in which the information layer is a composite layer or multi-film layer, these definitions may apply to a part of the composite information layer or to one or more films of the multi-film information layer.

The first-surface medium offers numerous advantages over a second-surface medium. By way of example, with first-surface medium, the radiation does not pass through the relatively thick substrate so that there is a relatively shorter optical path, in comparison with second-surface medium, thereby providing a significantly shorter working distance, in comparison with second-surface medium. Since there is a shorter working distance, a smaller objective lens diameter, for a given numerical aperture, can be utilized which results in smaller, lower mass optical components to achieve a greater degree of optical drive miniaturization. Furthermore, the first-surface medium is not sensitive to substrate birefringence and substrate thickness variations. The first-surface medium is also much less sensitive to substrate tilt.

In one aspect, a digital optical information disk contains content and/or non-content information on both sides of a single substrate produced by a process that embosses or molds the surfaces of both sides substantially simultaneously. Simultaneous molding substantially eliminates the need for lamination when two or more data layers are to be provided. Preferably, the disk is relatively small, such as less than 50 mm in diameter and can replicate marks or features with a z-dimension magnitude of about 80 nm or more. The disk remains within a specified opto-mechanical range of an optical transducer and has little, if any, non-planarity (warp) or other distortion. The disk can be used for reading pre-written or mastered content, e.g., in a user's device, and/or can include information or features that permits or supports utility functions, allowing the user to record data thereon. Such features can include tracking, sector, location, timing, or synchronization features or combinations thereof. Preferably, the disk is formed by an injection-only technique, although it is possible to provide suitable disks by an injection-compression technique as well.

BRIEF DESCRIPTION OF THE DRAWINGS

FIGS. 9A and 9B are top and bottom plan views of a disk having locating marks, according to an embodiment of the present invention;

FIG. 9D shows detail of a center key;

DETAILED DESCRIPTION OF THE PREFERRED EMBODIMENT

Figure 1A:
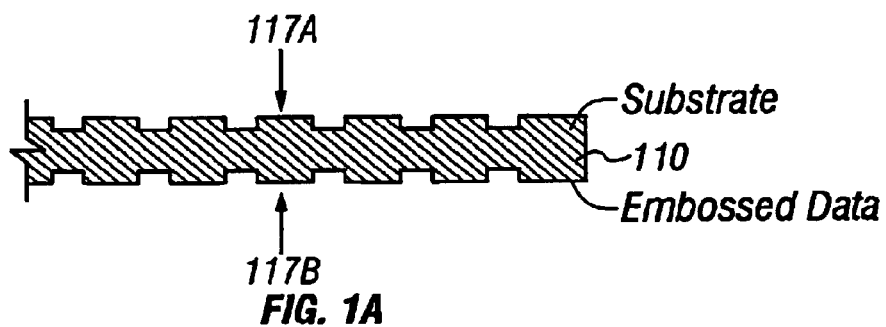
FIG. 1A is a cross-sectional view through an optical disk according to an embodiment of the present invention.
Figure 1B:
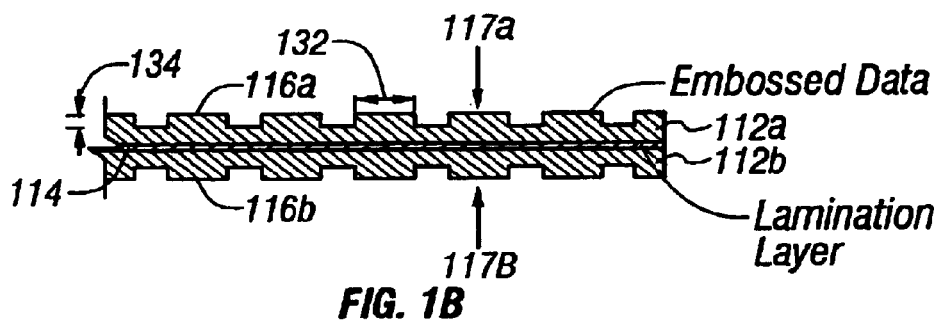
FIGS. 1B, C and D are cross-sectional views through disks according to previous approaches.

Before describing features of the present invention, certain aspects of previous double-data layer disks and disk fabrication, as well as certain aspects of previous injection-compression molding approaches will be discussed.

At least some previous approaches to providing multiple layers of digital optical data have involved laminating together multiple separately-formed data layers. For example, in the approach illustrated in FIG 1B, first and second half-substrates are separately formed and then laminated together, with a lamination material therebetween (such as an adhesive 114) with (in FIG. 1B) the embossed information surfaces 116a, 116b facing out. Although not shown in FIG. 1B, laminated disks will typically also include one or more coatings or layers such as protective layers over the embossed surfaces, thus requiring any read or write beams 117a,b to travel a substantial distance through such additional layers before reaching the data surfaces. In FIGS. 1A–1D read/write beams are depicted as directed vertically down (117a) and vertically up (117b). Although it is at least theoretically possible to provide disc readers with two or more read/write beams, in general only one beam is provided in a player, which either must traverse a first layer to reach a second layer (regardless of whether the beam(s) are directed down 117a,b or up 117a',117b' FIG. 1D) or involves (manually or automatically) removing, inverting and re-inserting a disk to read a second layer (FIG. 1C).

In the embodiment of FIG. 1C, two half-substrates 118a, 118b are laminated together with a lamination layer 122, but with the data surfaces facing inward, toward one another. In the configuration depicted in FIG. 1D, first and second half-substrates 124a, 124b are laminated together using a lamination layer 126 with one of the information layers facing outward and the other information layer facing inward. As noted above, typically, additional layers and/or coatings will be provided on exterior surfaces of the embodiment of FIG. 1C or 1D, thus requiring read or write beams to traverse such additional layers or coatings before reaching the data layers. Additionally, in the configuration of FIGS. 1C and 1D, a read or write beam 117a,b must travel through at least one of the half-substrates 118a, 124a in order to reach one or both of the inward-facing data surfaces. Accordingly, in embodiments of FIGS. 1C and 1D, the substrate material 118a, 124a must be substantially transparent, at least at the wavelength of the anticipated read or write beam.

Figure 2A:
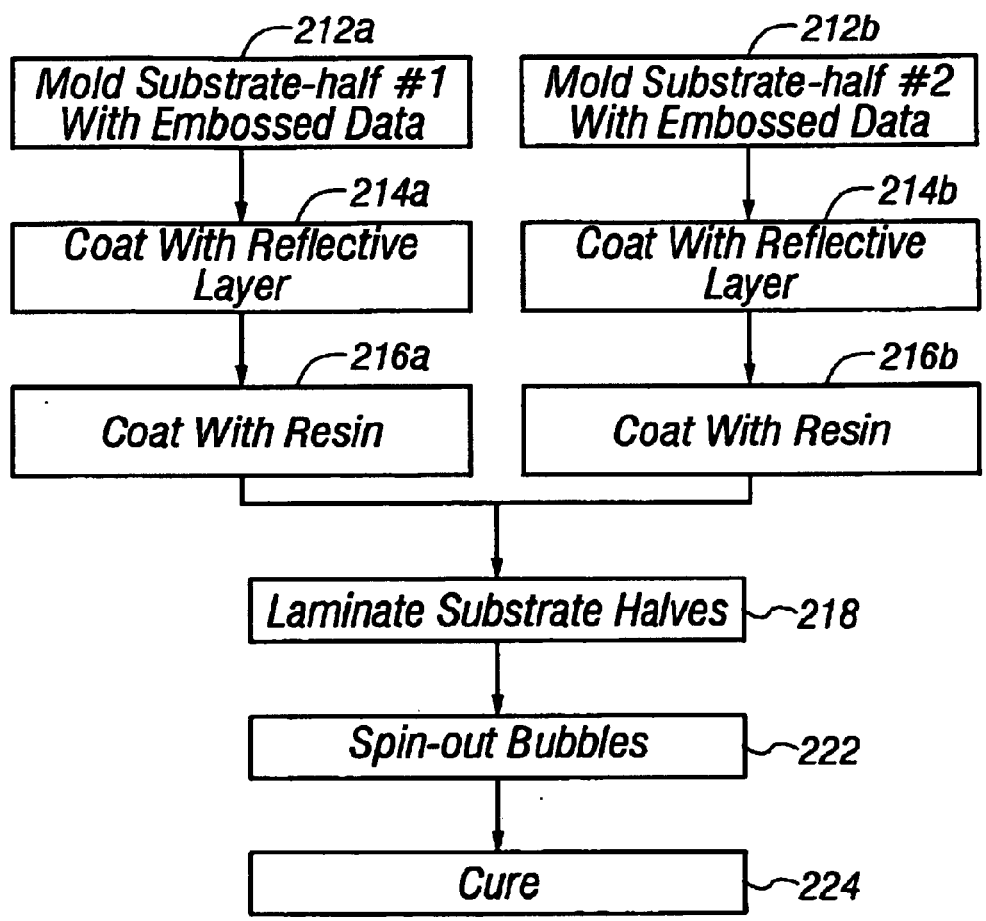
FIG. 2A is a flow chart depicting steps for fabricating conventional laminated disks.

Processes involved in producing laminated disks can be relatively involved and time consuming. FIG. 2A illustrates a (somewhat simplified) process flow for production of laminated disks. As noted above, production of laminated disks require separately molding first and second half-substrates 212a, 212b. Typically each substrate is separately coated with a reflective layer 214a, 214b and need to be separately coated (e.g., spin coated) with a resin layer (e.g., 0.025 mm thick resin 216a,b). The two half-substrates are laminated together 218, e.g., forming a 50 micrometer thick lamination layer. Such lamination typically requires care in order to achieve desired concentricity during lamination, it is generally necessary to maintain stringent size and composition specifications, e.g., to maintain disk parallelism and balance. In one approach, the best position for optical concentricity (e.g., with respect to the data thereon) is determined (separately for each half substrate) typically in a trial and error fashion. A center hole cutter is positioned (separately for each substrate half) to achieve optimal position with the center hole cutter often being positioned in the molding tool. A center hole is cut separately in each molded substrate half. For disks having only a single side which bears data, the process is substantially completed at this point. For multiple layer laminated configurations, the center hole (or the disk outer diameter) is typically used as the location datum to match the position of the two substrate halves for lamination. Since, typically, there will be some amount of non-concentricity (of the data pattern with respect to the disk) on each substrate half, aligning the halves using a center hole or outside diameter can result in a total tolerance which is the sum of the tolerance of each side's concentricity. Accordingly, in previous approaches, in order to achieve a desired maximum tolerance in the laminated structure 218, the maximum tolerable non-concentricity, during initial molding 212*a,b*, must be no more than about half the maximum total, final non-concentricity, potentially adding to the difficulty and cost of achieving a final product with desired tolerances.

After laminating 218, the structure is typically spun-out in order to centrifugally eliminate bubbles from the lamination layer 222. The lamination layer is then cured, such as with an ultraviolet (UV) curing process 224, e.g, to set the lamination adhesive or other lamination material.

Thus, a lamination process can introduce concentricity deviations at any of at least three steps: the molding of the first half-substrate, and its center hole cutting, the molding of the second half-substrate and its center hole cutting, and the alignment and orientation of the half-substrates for lamination.

The design of previous disks, and previous disk fabrication processes and apparatus was at least partially affected by the size of the smallest features to be replicated by the molding (or embossing) process. The replicated features can include any of a number of shapes including grooves, pits, ridges, bumps and the like. Typically, a disk will include both features which encode content (e.g., the encoded digital information which the user stores and/or reproduces) and non-content features (which may be digital in nature or otherwise) such as timing marks, sector identifiers and the like. In some approaches, some or all non-content features may be embedded in content.

At least some features of the present invention can be additionally considered in the context of a Data Device Model, having certain similarities to the International Standards Organization (ISO) network model. The Data Device Model is described and compared to the ISO model in U.S. application Ser. No. 09/393,150, filed Sep. 10, 1999, supra. The Data Device Model is a five layer model generally relating to layers 1–4 and 7 of the ISO telecommunications model. Generally, levels 5 through 7 of the ISO model are system specific and vary considerably. They are often simplified to a single layer (as is done in the Data Device Model). Data flows bidirectionally between layers using predetermined protocols and each layer is only concerned with transactions between layers directly above and below it.

The Physical Layer of the Data Device Model deals with physical media and the signals that represent 1's and 0's. It relates to the physical representation of the data via pits, marks, grooves, lands, physical modulation, reflective spots, photochromic marks, bubbles, magneto-optical regions, magnetic domains, and the like. Included in the Physical Layer is the process of reading and writing data which may be accomplished using optical, magnetic or thermal means, or a combination of methods and detection schemes such as phase detection, amplitude detection, reflectivity, polarization, and the like. The content of the data is irrelevant at the Physical Layer, although modulation schemes, e.g., optimized for the media, and read/write compensation methods, if provided, are included in this layer. For an optical disk drive, items such as focus servo, track following servo and random-access servo information features and information (which are used by the Data Link Layer but not necessarily by layers above the Data Link Layer) are part of the Physical Layer.

At the Data Link Layer of the Data Device Model, the data is organized into units typically called frames The Data Link Layer is concerned with the transmission and reception of data frames. To do so this layer must modulate/demodulate, encode/decode, and provide servo information to the Data Controller Layer. Each frame has a header (address) that includes physical location and embedded control information. A data link is a point to point communication connection consisting of the media and data send (write) or receive (read) link. At the Data Link Layer, data has embedded codes representing data boundaries, frame numbers, header information, etc. Some of these data are used solely by the link, and others are passed to higher information layers. Information is coded using methods appropriate to the media. Information transferred at the Data Link Layer would include, e.g., user binary files including those which are prerecorded or written to the disk.

The Data Controller Layer of the Data Device Model is concerned with the selection, extraction, and management of binary files between the source (data on a disk, for example) and destination (host computer, for example). The Data Controller Layer resolves the logical and physical location of the information stored on the disk. Services include data detection, demodulation, framing, interleaving, ECC processes, and Data Link Layer formatting. Data is encoded and packetized or extracted and stripped to create or extract user binary file information. The Data Controller Layer may extract or embed information management codes in the frame information. This layer provides servo algorithms and control systems for the proper operation of the link layer. Drive control information is parsed from the Host Interface Layer. The Data Controller Layer preferably provides intelligent cache management and may also provide encryption/decryption and key management services.

In the Host Interface Layer of the Data Device Model, binary files are transferred between the host and the drive via a high level, typically public, communication interface. Examples of this interface are USB, SCSI, ESDI, and the like. Data access commands such as seek, read, write, identification, information key request, and power management may be passed between the host and the drive.

The Applications and Services Layer of the Data Device Model, is concerned with manipulation of binary files by the host and, in principal, does not include or require drive related processes except those involving the host interface. Examples of these processes are file transfers, file manipulation, application software, user interface, and network communications, which generate specific command and control information to and from the drive in order to manage maintain and transfer binary files.

Embodiments of the present invention can be used for embossing or molding features which are used to provide or represent either or both of content information (e.g. data which can reach at least the Data Controller Layer, and, typically, the Applications and Services Layer, possibly with appropriate reformatting, decoding, etc., as described in connection with the Data Device Model), and non-content information (e.g. for uses as described above in connection with the Physical Layer of the Data Device Model).

Figure 3A:
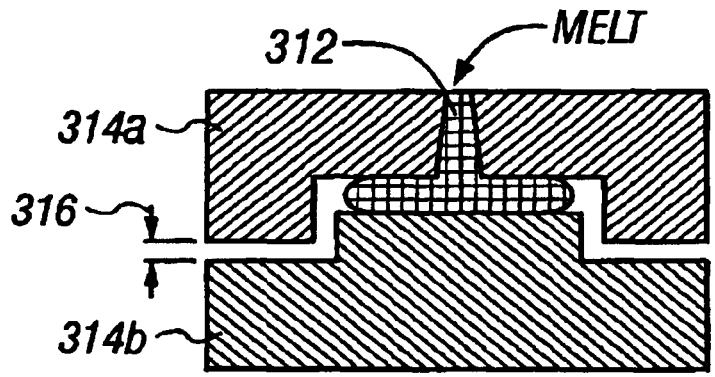
FIGS. 3A and 3B are cross-sectional views showing, in simplified form, first and second stages of an injection-compression process according to previous approaches.
Figure 3B:
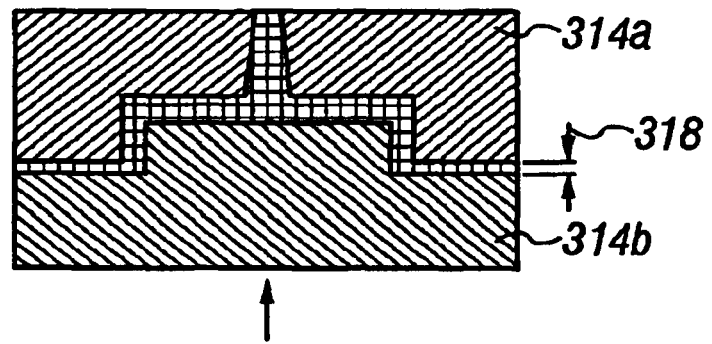

Regardless of the use, nature, or shape of the replicated features, there will generally be a minimum size requirement, i.e., such that a disk fabrication process must be capable of faithfully replicating features at least as small as such minimum size. In at least one application, a digital optical disk must contain features having a lateral dimension (e.g. in a track-wise direction 132 (FIG. 1B) of about 550 nm, in some embodiments, about 430 nm, and a z-dimension magnitude 134 of greater than about 80 nm, preferably greater than about 100 nm and more preferably greater than about 120 nm. Typical previous approaches have found it necessary to use an injection-compression molding process in order to replicate the very small features required for a digital optical disk. As depicted in FIGS. 3A and 3B, in an injection-compression process, molding material 312 is initially injected when the mold halves 314a,b are a first distance apart 316 and, after or during injection, the mold halves 314a,b are compressed or brought together, separated by a second, smaller distance 318. In general, for injection/compression molding of optical disks, the initial cavity thickness 316 is oversized (provides a thickness in excess of thickness of the final product) by approximately 1 mm. After, e.g., a polymer melt 312 is injected into the cavity, it is compressed by the press or plunger 314 at a controlled speed until a maximum force is reached. This press motion is then gradually decreased. The press motion is determined by the maximum force and the pressure required to squeeze the polymer melt. After the cavity is filled and as the material settles in the mold and cools, additional press movement may be provided.

Although injection compression can be a relatively expensive process to implement, it has been used in order to obtain desired accurate replication of relatively small features in (at least some) digital optical disks. Compression is believed useful in overcoming the relatively high viscosity of the injection material that can occur near the periphery of the mold cavity which, especially for larger-diameter discs, may substantially cool by the time it has traveled from the (typically central) injection port to regions near the periphery of large-diameter disks. Without wishing to be bound by any theory, it is believed that compression was typically necessary in previous approaches because, generally, at least portions of the injection material, particularly near the outer edge or perimeter of the disk, cools to a degree, e.g., by contact with the mold, that viscosity increases to a degree that it cannot be successfully deformed sufficiently to replicate relatively small and/or deep features, without the additional compression step.

In at least some injection-compression approaches, a ring, wall or structure is coupled to one of the mold halves 314a,b (with the other mold half bearing a stamper defining the features to be replicated). The ring structure can define the thickness of the molded product (acting as a limit to mold compression), providing for perimeter venting as well as defining the outside diameter of the molded product (forming a cylinder wall, so that compression can be achieved). In general, it has been found substantially infeasible to provide a stamper on the same mold surface that a ring is coupled to. Accordingly, as a practical matter, previous approaches have generally used injection-compression only for forming items having data-embossing on only one of the disk surfaces.

Figure 1C:
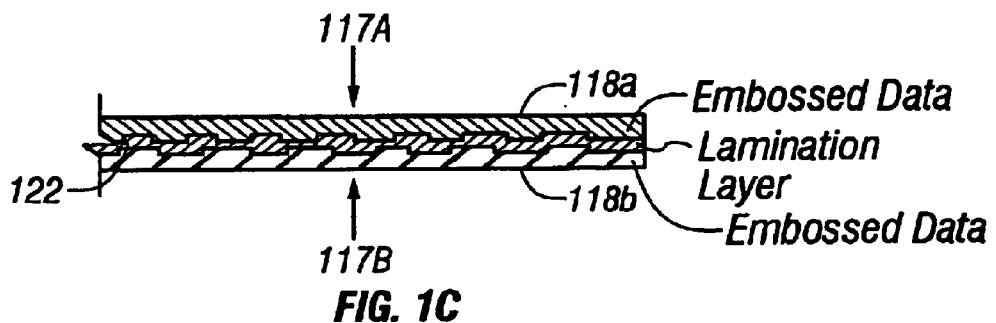

The present invention provides a single, integral (non-laminate) disk having outward-facing data layers on both sides of the disk, e.g., as illustrated (in simplified fashion) in FIG. 1A 110. In one embodiment, a double-sided disk (a disk with a first data layer optically readable by a beam which initially impinges on a first surface of the disk and a second data surface optically readable by a beam which initially impinges on a second, opposite surface of the disk is produced using an injection-only molding process (i e., substantially without the need for a compression step during or after injection). However, in other embodiments, it is also possible to use an injection-compression process for providing a double-sided (non-laminated) digital optical disk, preferably with features with z-dimension magnitudes of about 80 nm or more, and track-wise and/or radial dimensions of 550 nm or less, preferably 430 nm or less.

Figure 4A:
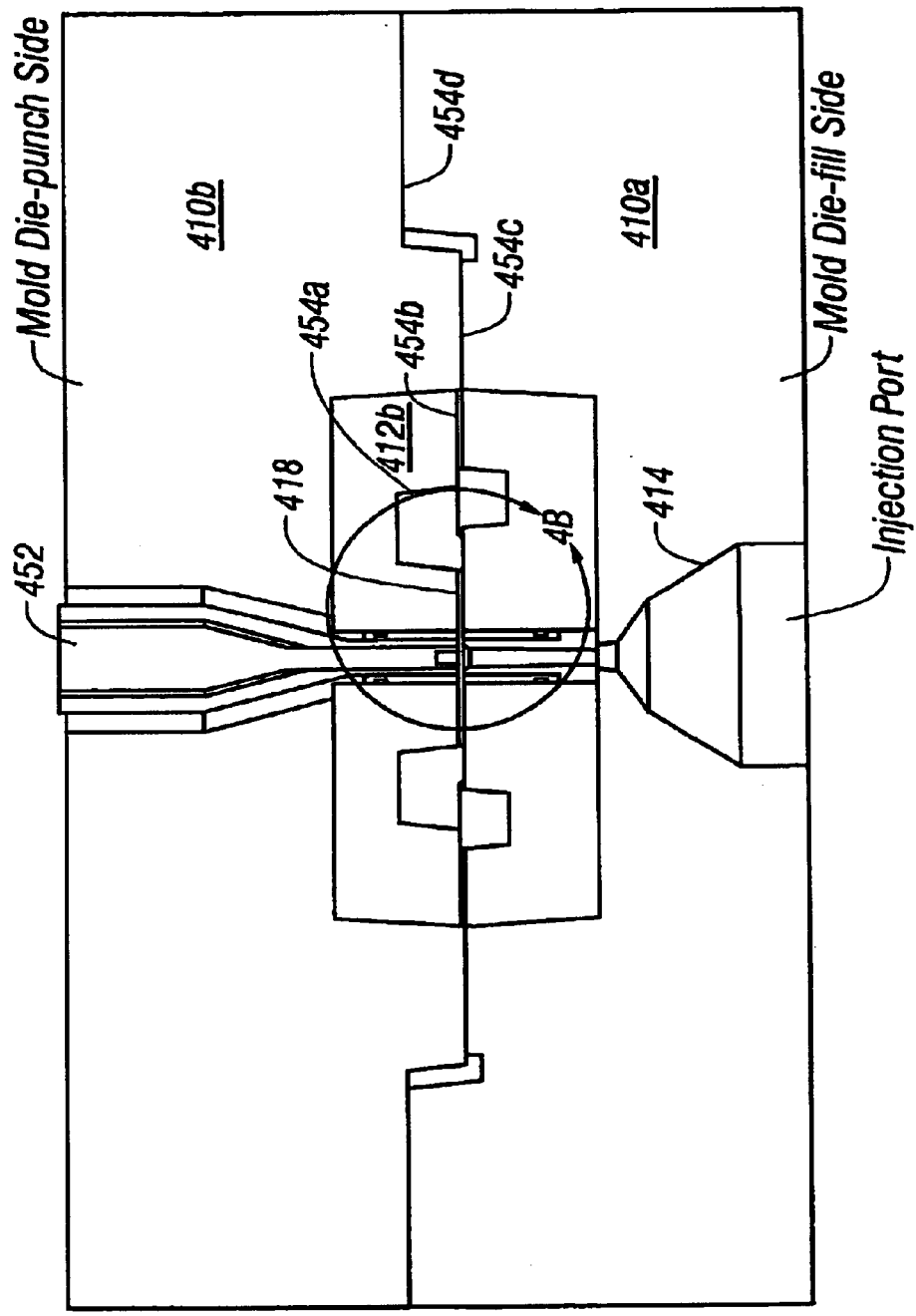
FIG. 4A is a partial cross-sectional view through a mold device according to an embodiment of the present invention.

FIGS. 4A and B illustrate a molding apparatus of a type which can be used for producing a double-sided disk according to an embodiment of the present invention. A number of molding presses can be used in embodiments of the present invention. As one example, at least some embodiments of the present invention can be implemented using a model MDM-1 molding machine available from Meiki. As shown in FIG. 4A, a first "fill side" mold die 410a includes an injection port 414 leading to an injection channel 416 in communication with a mold cavity 418 defined between a first, "fill side", stamper 420 and a second, "punch side", stamper 422 (best seen in FIG. 4B) positioned adjacent mirror blocks 412a,b respectively. Vent rings 436,437 to provide venting of air displaced by molding material. Each of the stampers 420, 422 has been formed with a negative image of the features desired on the disk surfaces, formed on the cavity-side surfaces thereof FIG. 10 shows plan and cross-sectional views of punch side and fill side stampers of a type that can be used in connection with the apparatus of FIGS. 4A and 4B. In one embodiment, suitable for producing an optical disk with a diameter of 32 mm, the punch side stamper 422 has a diameter 1012b of 33 mm while the fill side stamper 420 has a diameter 1012a of 47 mm. In one embodiment, the stampers have a thickness 1014 of 0 3 mm. The stamper is typically formed of a metal such as electro-deposited nickel.

Figure 14A:
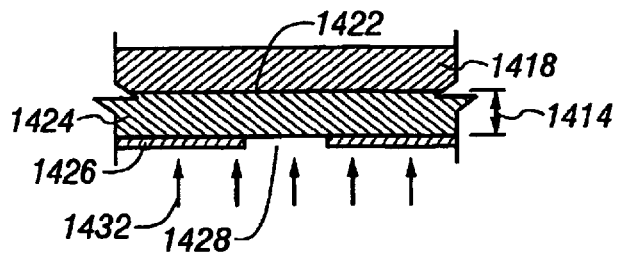
FIGS. 14A and B are cross sectional views of stages in preparation of an arrangement for forming a stamper.
Figure 14B:
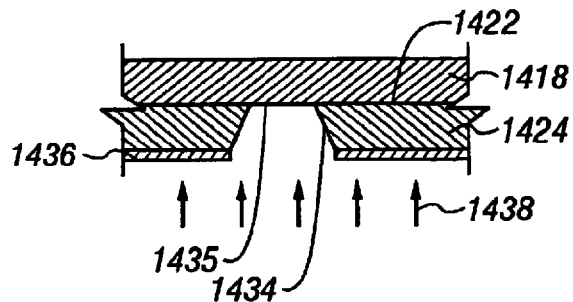
FIGS. 14C and D are partial bottom and top perspective views of a portion of a stamper formed from the arrangement of FIG. 14B.
FIG. 14E is a partial perspective view of a portion of a disk formed using the stamper of FIGS. 14C and D.
Figure 14C:
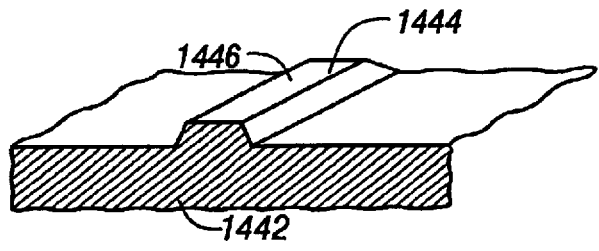
Figure 14D:
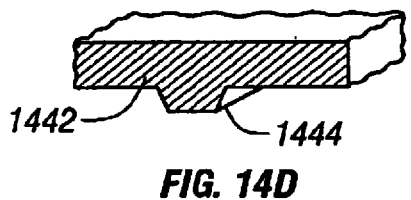
Figure 14E:
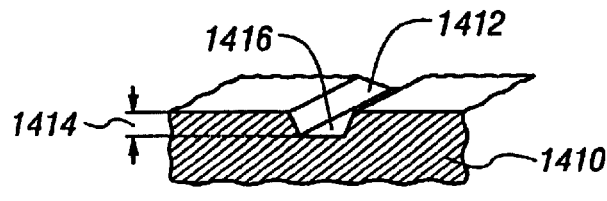

A number of processes can be used for forming the stampers, as will be understood by those of skill in the art after understanding the present disclosure. The choice of which process is used may be affected by a number of factors, including cost and time requirements, number of disks to be formed, whether the disks are read-only or read-write, and which surfaces or features ne to be defined with greatest precision, such as having most nearly-perfectly flat surfaces. In the process illustrated in FIGS. 14A–14E, it is desired, e.g, to form, a disk 1410 having a plurality of grooves 1412 (FIG. 14E) with a predetermined z-dimension magnitude 1414 with the floor 1416 of the grooves being highly planar or flat If FIG. 14A, a plate, such as a glass plate 1418 has at least one surface 1422 which is planar or flat to a high degree of accuracy. This flat-surface 1422 is coated with an etchable material which, in turn, is covered with a pattern of protectant material 1426, typically a photoresist material (with the pattern typically being formed by a photoresist process, well known to those of skill in the art). The areas 1428 not protected by the patterned protectant 1426 are etched 1432 leaving a patterned layer 1424' of etchable material defining a groove 1434 substantially of the size and shape desired for the groove 1412 of the disk. As seen in FIG. 14B, the "floor" 1435 of the groove 1434 is formed by the above-described flat-surface 1422 of the plate 1418 A stamper may be formed by coating the grooved surface 1436 e g. using electroplating 1438. Removal of the electroplated material provides a stamper 1442 (FIG. 14C) having a ridge 1444 with a size and shape corresponding to the groove 1434. The structure of FIG. 14B can be electroplated numerous times, to form a number of stampers. Because the upper surface 1446 of the ridge 1444 results from electroplating the "floor" 1435 of the groove 1434, it will have a high degree of flatness, since it substantially replicates the flatness of the flat-surface 1422. FIG. 14D illustrates the stamper portion 1442 inverted. The stamper can then be used to form a disk, as described herein. As seen in FIG. 14E, the ridge 1444 of the stamper 1442 provides a groove 1412 in the disk 1410, with a size and shape corresponding to the size and shape of the groove in FIG. 14B. Since the upper surface 1446 of the stamper ridge 1444, which forms the floor 1416 of the disk groove 1412 has a flatness determined by the flat-surface 1422 of the plate 1418, the floor 1416 of the disk groove 1412 will also have a high degree of flatness, substantially as flat as the flat-surface 1422 of the plate 1418. As will be understood by those of skill in the art after understanding the present disclosure, other processes than that illustrated in FIGS. 14A–14E can be used, e.g. when it is desired to provide a high degree of flatness for other surfaces (such as lands, ridges, bottoms of pits or tops of bumps), such as by forming ridges in the structure of FIG. 14B where grooves are desired in the disk, and using an electroplated mass (or other negative copy) as a form for creating a stamper (rather than creating a stamper directly from the structure of FIG. 14B.

Figure 4B:
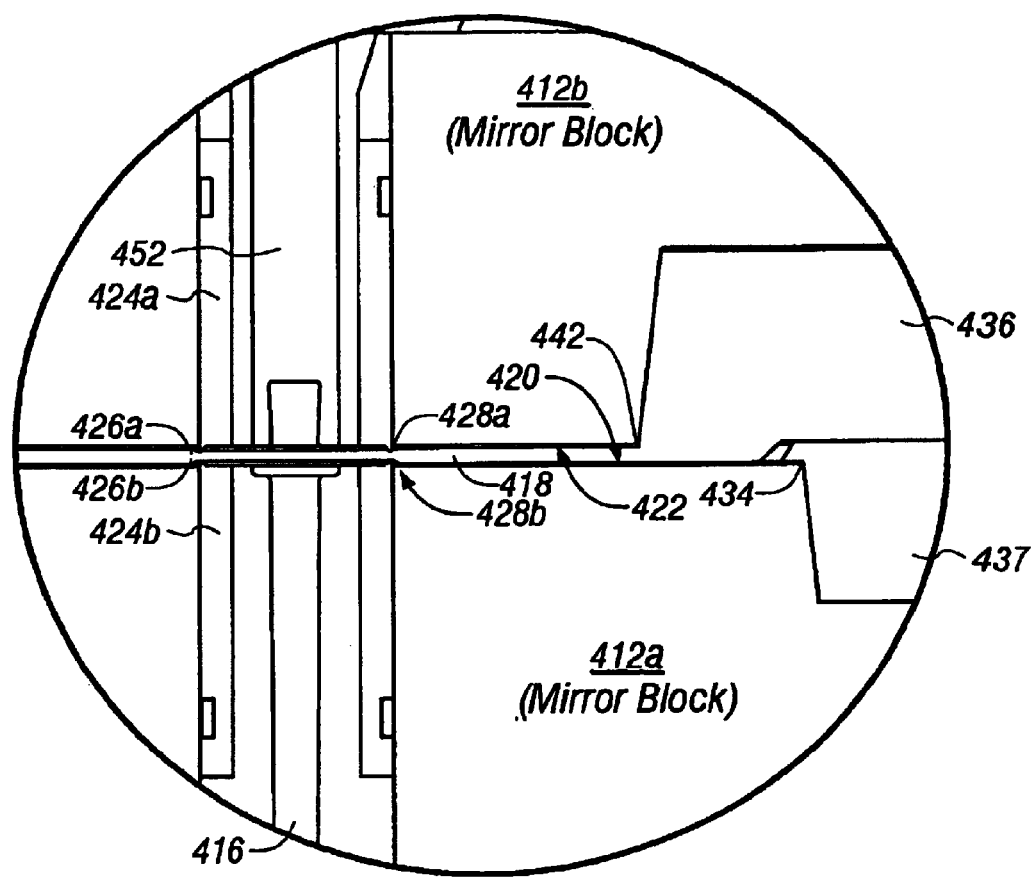
FIG. 4B is an enlarged view of region 4b—4b of FIG. 4A.

As seen in FIG. 4B, A punch side (inner) vent ring 436 defines the outer diameter (O D) of the disk. In the depicted configuration, one of the stampers (in the illustrated embodiment, the fill side stamper 420) has a larger diameter than the other (punch side) stamper 422, which facilitates retaining the stampers 420 outside the content area of the stamper. The punch side vent ring preferably defines the outer diameter of the finished disc, although in some embodiments further laser trimming or other trimming or treatment of the outer edge can be performed, if desired. In one embodiment, vent ring 436 is configured to define a disk edge which is not perpendicular to the disk surfaces, such as having a draft angle, e.g. of 0° to about 5° or more.

Figure 2B:
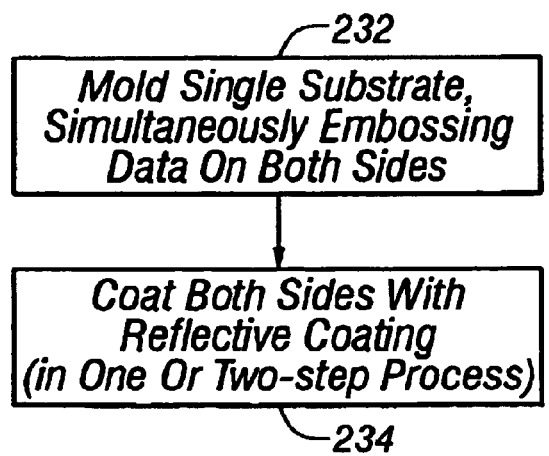
FIG. 2B is a flow chart depicting steps for fabricating double-sided disks according to an embodiment of the present invention.

In operation, and with additional reference to FIG. 2B, liquid resin is injected at an elevated pressure (e.g., about 80 MegaPascals, in one embodiment) through the injection port 414 and fills the cavity 418 formed between the stamper surfaces 420, 422. At least partially because of the smaller diameter of the molded discs in some embodiments, the discs can be injection molded without using large injection (and/or compression) pressures. Avoiding use of very large pressures is believed helpful in achieving and maintaining substantial planarity of the discs and avoiding warping.

Without wishing to be bound by any theory, it is believed that the relatively small diameter of the cavity 418 (e.g, compared with the 120 mm diameter of a typical CD or DVD) is at least partially responsible for the success in replicating small stamper features, such as features having a z-dimension of about 80 nm or greater, even if located near the outer diameter of the cavity, without the need for compression during or following injection.

Figure 5:
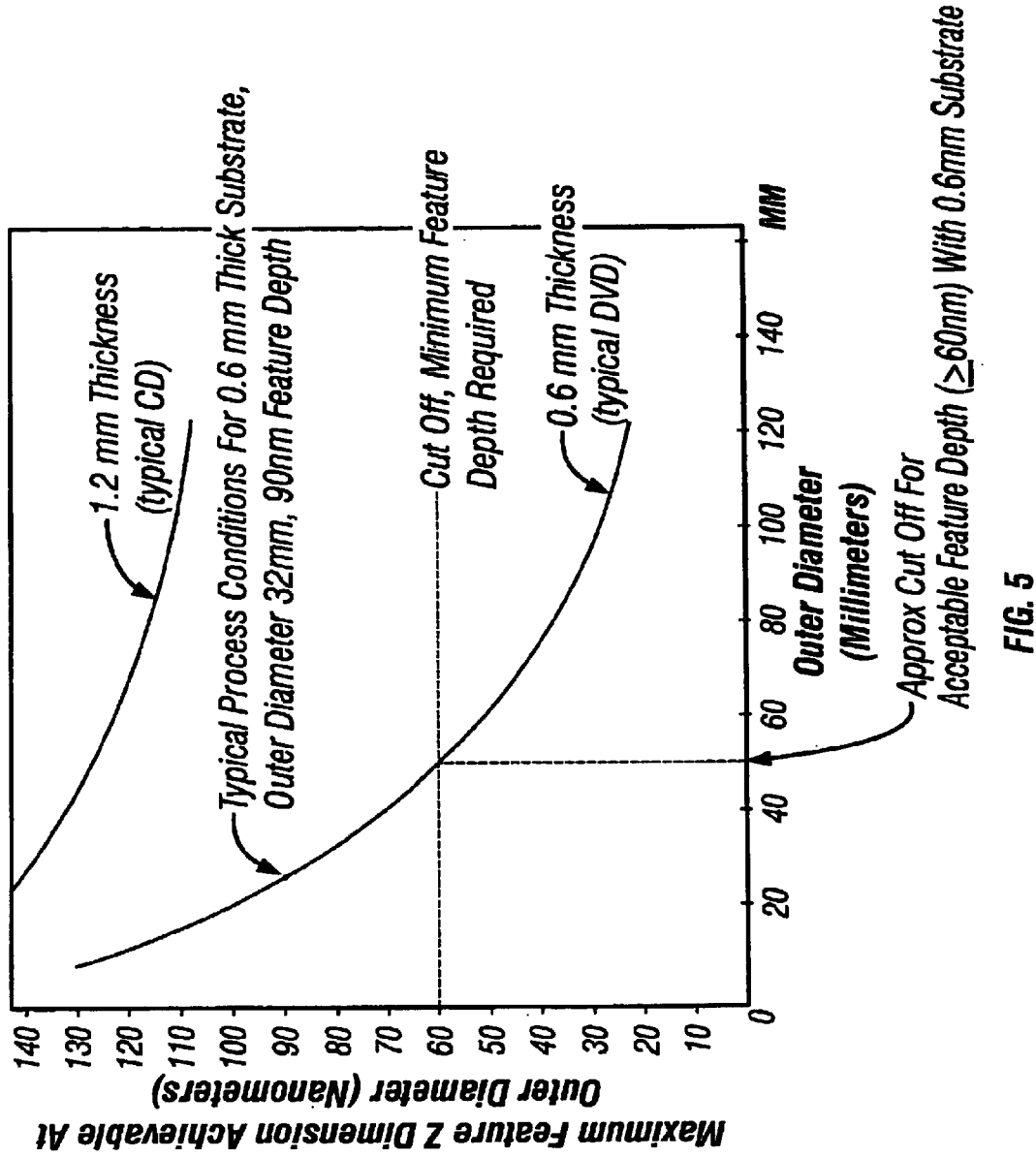
FIG. 5 is a graph depicting the relationship of disk diameter to the z-dimension magnitude of features that can be injection molded for two different disk thicknesses.

Without wishing to be bound by any theory, it is believed that the smaller cavity diameter means that less time is required for the resin to flow from the injection port location to the farthest extremities of the cavity and accordingly, the injection material remains relatively hot (and, thus substantially less viscous) at the outer diameter of the disk, following injection, compared to the temperature (and viscosity) of injection material for larger-diameter disks. This effect is illustrated in FIG. 5 which, while based on measurements and experience, is intended to present what are believed to be general trends. As seen in FIG. 5, in general, when injection molding is used, as the disc diameter increases it becomes progressively more difficult to achieve a suitable feature (groove or pit) depth especially at the at the outer diameter. The liquid resin has appreciable viscosity and in order to fill the deep features on the disc the resin temperature has to be raised to maximum such as 320 deg C. to ensure ease of flow. As the resin flows through the cavity of the mold to the perimeter it cools, and it becomes more difficult to fill the deeper features. Hence as shown in FIG. 5 the maximum feature depth achievable (at the outer diameter) is smaller as the outer diameter is increased. Increasing the initial resin temperature beyond a certain point is not possible because of degradation in the material properties. In addition as the disc thickness is decreased (say from a CD thickness of 1.2 mm to a DVD thickness of 0.6 mm) the difficulty of forcing the resin into the outer diameters in a liquid state is exacerbated as the cooling influence of the mold cavity walls is greater as the width of the cavity (which becomes the thickness of the disc) is decreased. Such problems are somewhat easier to solve if the process of injection-compression is used. In that case, it is possible to achieve a feature depth of better than 140 nm at the outer diameter of a 120 mmdisc that has a 0.6 mm thickness. But, as noted above, such a process is more complex and expensive to operate and has some difficulty regarding fixturing when used in a simultaneous double sided mode. Nevertheless it is feasible that such a process can be used in molding double-sided media, according to some embodiments of the invention.

In order to achieve the desired magnitude in the z-dimension in the replicated disks using injection molding (i e. without compression), a relatively smaller-diameter disk is used, according to one embodiment of the invention. In general, for a digital optical disk to be useable, in practical terms, the disk should have features with a z-dimension of about 60 nm, preferably 80 nm and even more preferably as deep as 90 nm or more. As seen in FIG. 5, by providing a disk with a diameter of 32 mm and thickness of 0.6 mm, an injection molding process is within a region at which features with a z-dimension magnitude of 90 nm can be replicated. Accordingly, one aspect of the present invention includes the recognition that reducing disk diameter, in general, makes it possible to achieve desirable feature replication using relatively simpler and/or less expensive fabrication processes and materials (such as by substantially eliminating the need for compression).

As seen in FIGS. 4A and 4B, injection molding of the type illustrated in the figures can be performed in the absence of an outside stop ring. As noted above, injection-compression is typically used for forming a disk with data being embossed on only a single side of the disk, at least in part because of the infeasibility, in previous approaches, of providing a stop ring when two stampers are in place. However, as shown in FIGS. 4A and 4B, the illustrated molding apparatus can be employed without providing a stop ring of the type commonly used in injection-compression systems. Accordingly, it is possible to provide the both the first and second stampers 420, 422 so that digital optical data can be readily embossed on both sides of the disk substantially simultaneously.

A number of injection or molding materials can be used in various embodiments of the present invention. In general, it is preferred to use a material which can substantially hold a size and shape tolerance under conditions of normal expected use, including temperatures between about −10° C. and about +45° C. and rotational speeds of up to about 5000 RPM (generally referred to as "engineering plastics"). In one embodiment, polycarbonate material such as that available under the trademark Lexan OQ1020 sold by GE Plastics, can be used. Polycarbonate is a useful molding material at least in part because it is widely used in molding and accordingly has well known characteristics and properties in molding operations. Preferably, the disks formed according to the present invention are first surface media, as described above. In first surface media, there is no need for light to travel through the substrate. Accordingly, at least some embodiments of the present invention can use a molding material which produces a disk substrate that is substantially non-transparent (at least in the wavelength of the read/write beam). By removing the constraint that the molding material must be transparent, it becomes possible to use molding materials which have a wide variety of different properties but may not be transparent. For example, in some embodiments the mold material can be configured to provide a substantially electrically conductive disk (e.g., to minimize static electricity and/or accumulation of dust and debris on the disk surface, this can be particularly useful in the utilization of first surface technologies). In some embodiments, the injection material may be provided with metallic or other conductive fill, such as about 40% carbon fiber, and/or fine particles of stainless steel or copper, e.g., to provide substantial electrical conductivity to the disk (which can assist in overcoming problems associated with the buildup of static electricity). One example of this type of molding material is a statically conductive, carbon fiber reinforced polycarbonate having about 40% carbon fiber and about 60% polycarbonate resin, such as that available from LNP Company under its trade name Stat-Kon DC series DC1008. Table II provides typical properties for such a molding material

TABLE II

| PROPERTY | ASTM METHOD | UNITS | VALUE |
| --- | --- | --- | --- |
| specific gravity | D 792 | N/A | 1.390 |
| shrinkage | D 955 | % @ 0.125" | .10 to .20 |
| TG (glass transition) | D 3418 | F | 300.0 |
| water absorption | D 570 | % | .06 |
| Surface resistivity | D 257 | ohms | 10+ |
| Volume resistivity | D 257 | ohm-cm | 10+ |

Following injection into the cavity, and following a pre-determined hold, (such as about 5 seconds or less) the disk is substantially molded, simultaneously embossing data on both sides 232 (FIG. 2B).

After the hold period, the two halves of the mold 410a,b are moved apart, and a punch 452 punches out a central portion, freeing the molded disk from the central sprue (which typically will have at least partially hardened in the injection channel 416), so that the disk can be removed from the cavity 418. The hole formed by the punch in order to detach the disk from the sprue is not necessarily the final center hole for the disk. After removal of the sprue, the mold can then be closed to place it in condition for the next molding operation. A number of molding conditions can be used in implementing the present invention, as will be understood by those of skill in the art. Table III provides an example of molding conditions useable with a polycarbonate resin, for implementing an embodiment of the present invention.

TABLE III

| | |
| --- | --- |
| melt temperature: | 326 85° C. |
| coolant temperature: | 130° C. (upper mold half) and 132° C. (lower mold half |
| fill time: | 0.25 seconds |
| post-fill time: | 10 seconds |
| holding pressure: | 50% of max pressure, 81.7 MPa |
| timer for hold pressure: | 5 seconds |
| press tonnage used: | 2.0E+05 N |
| press waiting time: | 0.1 seconds |
| press packing time: | 10.0 seconds |
| gate open/close option after gate packing: | 1 (close) |

The removed disk can be further treated such as being coated, preferably on both sides, with a reflective coating (e.g., via a sputtering process or the like), in either a one-step (both sides of the disk) or two-step process 234. Additional protective and/or anti-reflective or other coatings can be applied, e.g., as described in U.S. patent application Ser. No. 09/315,398, filed May 20, 1999, entitled "Removable Optical Storage Device and System," and/or U.S. patent application Ser. No. 09/560,781, filed Apr. 28, 2000, entitled "Miniature Optical Disk for Data Storage," supra.

Figure 6:
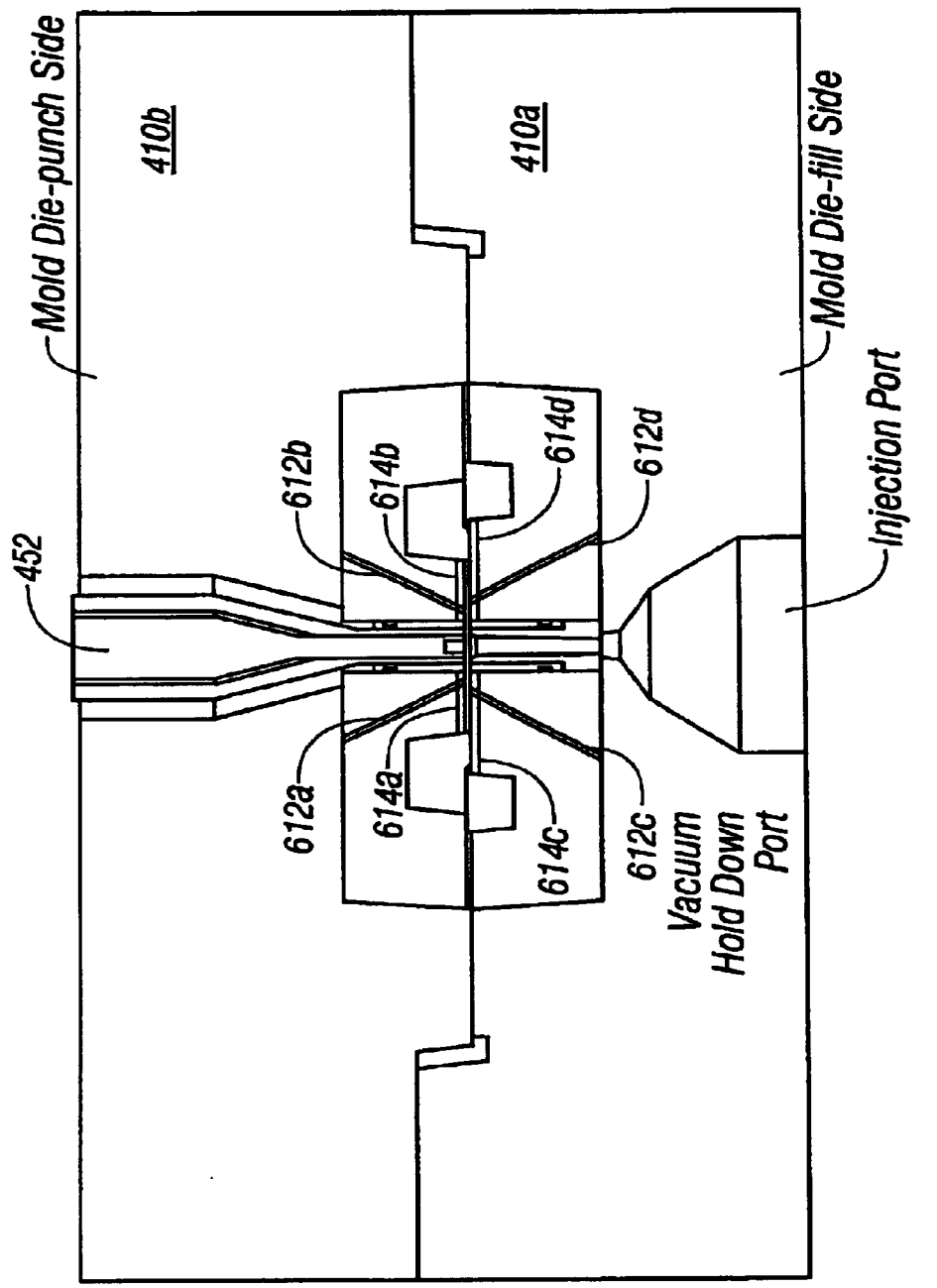
FIG. 6 is a view similar to that of FIG. 4A, but showing an embodiment which includes vacuum hold downs.

FIG. 6 depicts an embodiment similar to that depicted in FIG. 4A but additionally providing a plurality of a vacuum hold-down conduits 612a,b,c,d providing a connection from a vacuum source (not shown) to perforated plates or other vacuum manifolds 614a,b,c,d adjacent the back surfaces of the stampers, to further assist in holding stampers in position, and preventing undesired stamper distortion (e.g., during stamper positioning, as described below, production molding and/or mold opening and the like).

An important feature of an optical disk is concentricity. In general, an optical disk will contain a feature which determines the axis of rotation of the disk as it is used in a player or writer device. In some previous disk types, such as DVD or CD types, the center hole mates with a spindle, and thus it is the center hole which determines the axis of rotation. Other features which can be used for determining the axis of rotation include a hub, e g., as described in U.S. patent application Ser. No. 09/560,781, filed Apr. 28, 2000, entitled "Miniature Optical Disk for Data Storage," supra. It is also at least theoretically possible to use the outside diameter of the disk to define the axis of rotation.

Figure 7:
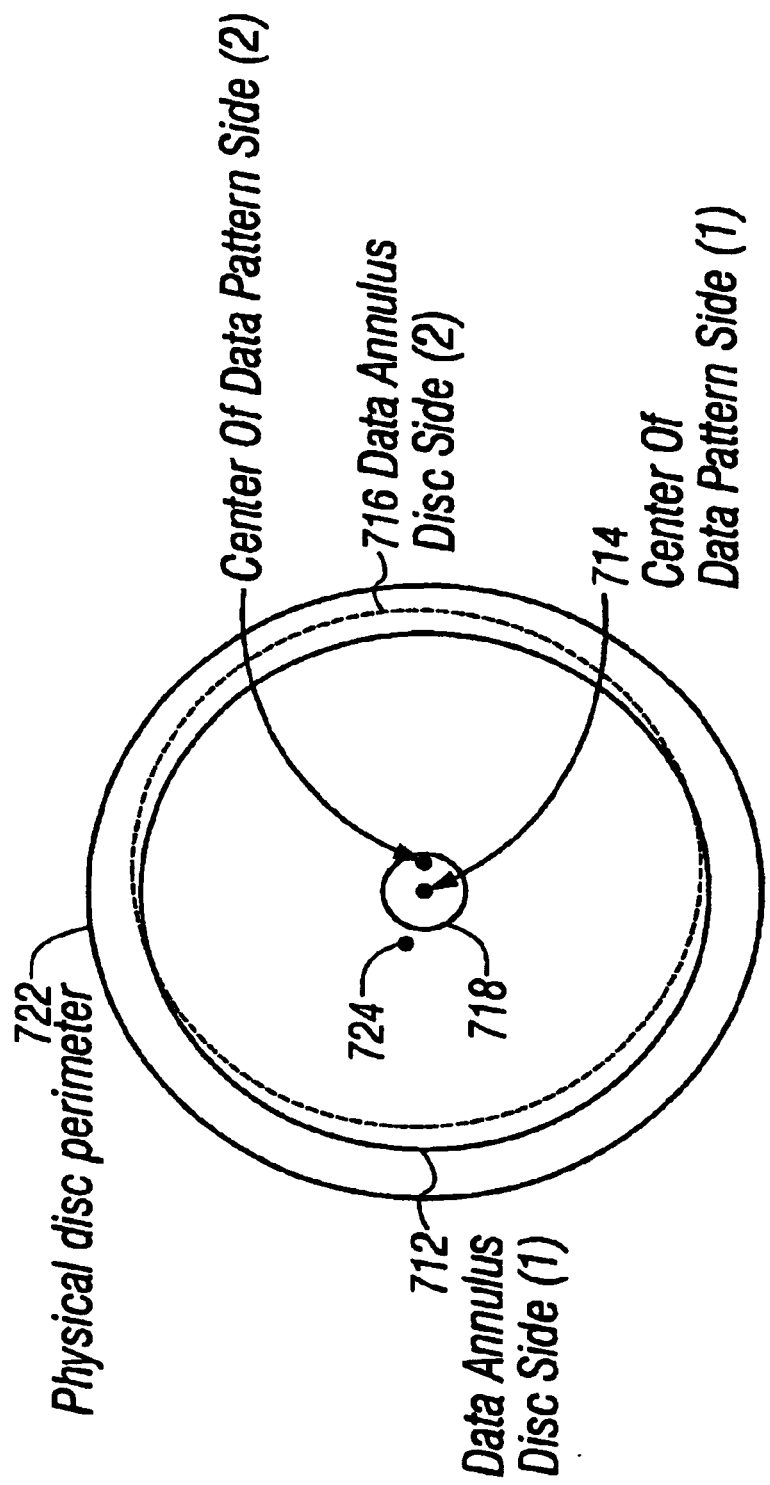
FIG. 7 is a plan view showing, in exaggerated form, a non-concentric relation of a data pattern to a disk.

In general, some or all data read from and/or written to an optical disk is located in substantially annular region positioned somewhere between the ID and OD of the disk. In this context "data" includes both content and non-content features. In at least some embodiments, data will be positioned along a plurality of substantially circular (or circular-segment) tracks having a common center. Thus, data on a disk surface can define a center of the data pattern. Concentricity refers to the degree to which the center of the data pattern coincides with (or is spaced from) the axis of rotation of the disk. For example, in some optical disks, concentricity can be expressed as the distance between the center of the center-hole and the center of the data pattern with reference to FIG. 7, concentricity can also be defined as the diameter of a circle circumscribed by the center of the data pattern annulus when rotated about the center point of the mechanical disk 724, as defined by the outer diameter 722 "runout" is twice the concentricity. In the illustration of FIG. 7, the data annulus of side two (712) defines a center of the data pattern 714 and the data annulus of the opposite or second side of the disk (indicated in phantom 716) defines a different center of the data pattern 718 which will thus define a different concentricity for the second side. The chord 718–714 length is the side-to-side data pattern concentricity. In typical previous optical disk devices, it is required that the diameter which defines concentricity, does not exceed 0.05 mm on each side of the disk (relative to the outer diameter of the disk). Additionally, in previous devices, the center of the data annulus on the first side must also be within 0.050 mm of the center of the data annulus of the second side. Stated in another way, the concentricity of the data pattern relative to the disk outer diameter and the side-to-side concentricity must both be within 0.05 mm. Although at least some standards use the above definition, which is provided in terms of concentricity with respect to an outer diameter, in practice, it is possible to use either the outer or the inner diameter as the reference diameter.

In general, the center of the data pattern will be determined by the position of the stamper within the mold. When the deviation from perfect or ideal concentricity is too large, the data pattern will "wobble" excessively as the disk is rotated, requiring tracking procedures or apparatus of a read or write device to accommodate relatively large track excursions at the (typically rather high) disk rotation rate. Thus, the amount of concentricity deviation which can be tolerated will depend somewhat on factors such as the tracking ability of the reader or writer, the maximum diameter of the data annulus and the like. Conversely, an ability to produce disks with a low measure of concentricity i.e. disks with near-ideal concentricity) can permit such disks to be used in readers which are less tolerant of concentricity errors and, typically less expensive.

Figure 1D:
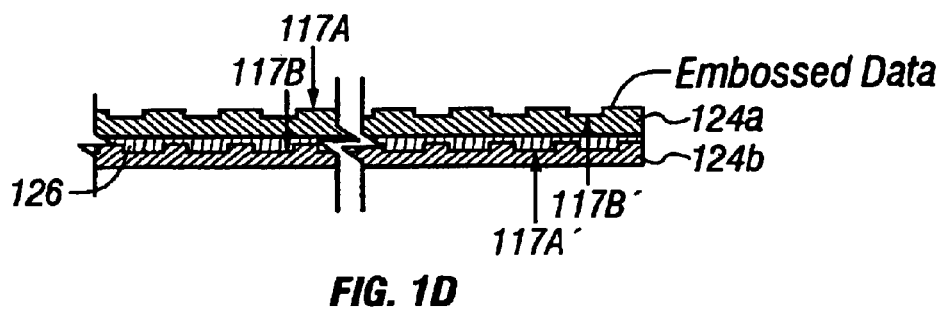

In at least one embodiment, the present invention can provide a concentricity deviation, on either or both sides of the disk, less than about 0.035 mm preferably less than about 0.020 mm and more preferably less than about 0.015 mm. Embodiments of the present invention can provide concentricity deviation of data on one side compared to data on the other side (side to side concentricity), less than about 0.035 mm, preferably less than about 0.020 mm and more preferably less than about 0.015 mm. When two data layers are provided in a laminated fashion such that both layers are read or written to using a beam which impinges a single side (e.g., as illustrated in FIGS. 1C and 1D) it is possible that the two half substrates will be laminated in such a fashion that concentricity excursions for the two substrate halves are aligned along substantially the same axis but are in opposite directions. In this situation, reading or writing operations which access both layers will need to accommodate a wobble or non-concentricity which is equal to the sum of the non-concentricity in the two layers. Accordingly, in at least some configurations, tolerances for each half substrate of laminated disks are about half of the tolerances for single data-layer disks In the case of a disk which has both a center hole and a hub, with the hub ultimately determining the axis of rotation, in at least some embodiments, the amount of concentricity adjustment that can be achieved by adjusting hub placement is limited (e.g., the hub or hubs must be placed within a maximum deviation from concentricity with respect to a central hole or outside perimeter of the disk) and accordingly even when some amount of adjustment can be achieved by hub placement, there is still a maximum concentricity deviation that can be tolerated between the data pattern center and the center hole or OD (disk perimeter) center.

In contrast to lamination process, such as those described above, according to embodiments of the present invention, the concentricity deviation (if any) for both sides, with respect to the center hole feature (or other axis-of-rotation determining feature) are all determined substantially simultaneously, since both data patterns and, preferably, center hole locators are formed simultaneously, reducing the number of independent stages at which concentricity deviations can be introduced.

In previous approaches for single sided molding, a center hole cutter is positioned with respect to a molding apparatus, typically using a trial and error process, to achieve a desired degree of concentricity of the center hole with respect to the data annulus. In the case of laminate disks, such as DVD disks, the center hole, or outer diameter, are used as location data to match the two halves.

Previous approaches, which involve positioning a center hole cutter with respect to a particular data pattern are believed to be generally undesirable or infeasible for at least some processes disclosed herein, involving simultaneous molding of two data patterns E.g., in general, positioning a center hole cutter with respect to one of the data patterns will not necessarily provide acceptable (much less optimal) positioning of the center hole with respect to the second data pattern.

Figure 11:
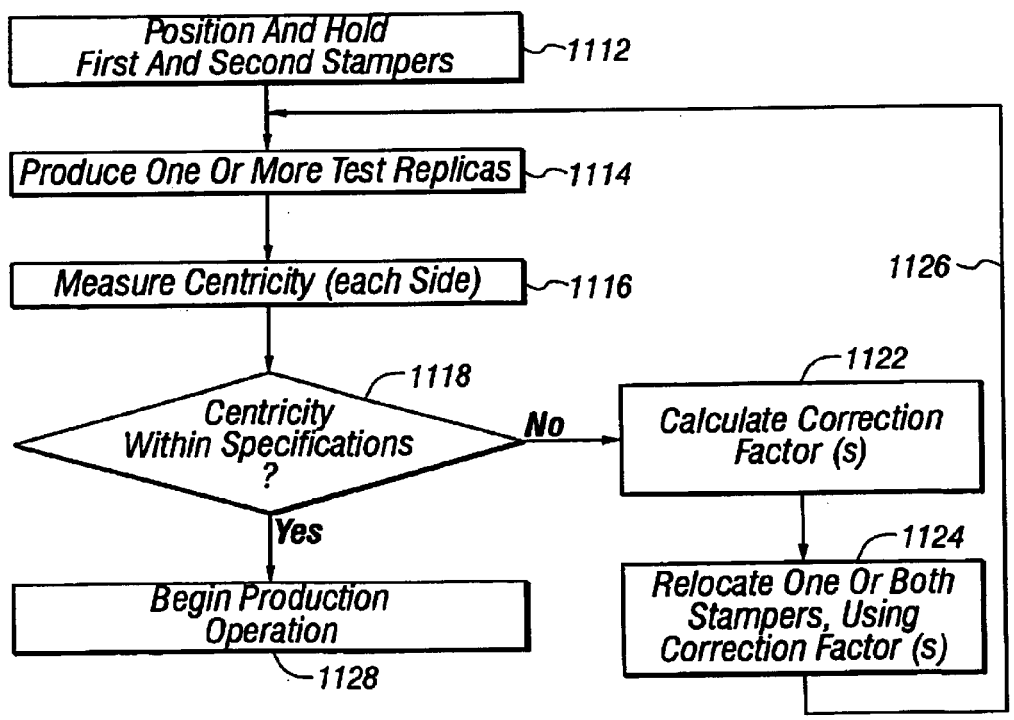
FIG. 11 is a flow depicting a stamper positioning process according to an embodiment of the present invention.

According to one embodiment of the present invention, the position of each stamper within the mold can be adjusted, preferably in accordance with concentricity measurements made on test pressings, and the process can be iterated to achieve acceptable tolerances or concentricity deviations. As illustrated in FIG. 11, the process can involve initially positioning and holding (e.g., using edge clips as described above) first and second stampers within a molding device 1112. This setup is used to produce one or more test replicas 1114. The replicas are measured to determine the concentricity on each side 1116. If measurements indicate concentricity not within specifications 1118, correction factors are calculated 1122.

Figure 8A:
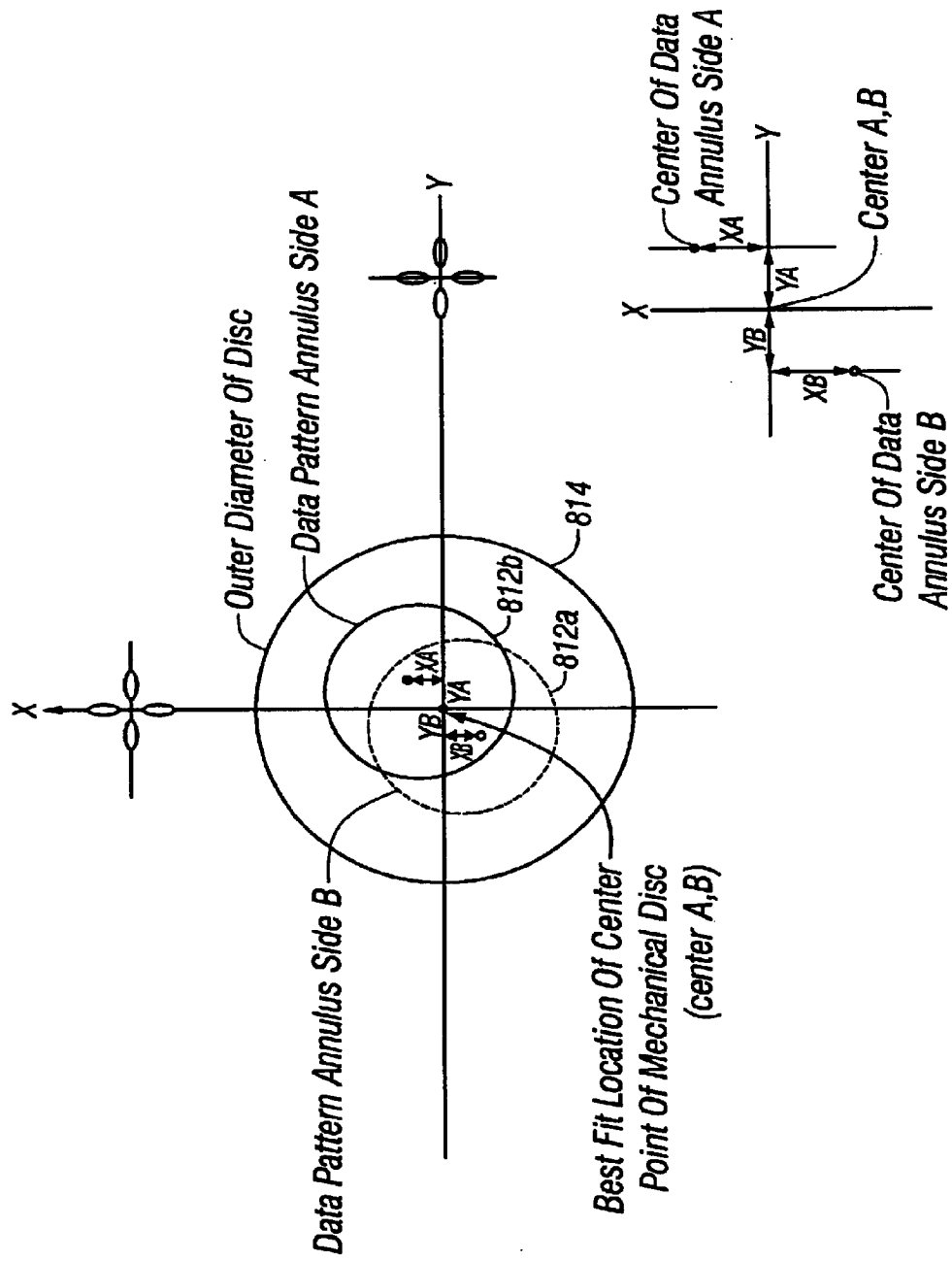
FIG. 8A is a plan view showing in exaggerated form a non-concentric relation of a data pattern to a disk in the context of a Cartesian co-ordinate system.

In general, the measurement can be performed on test disks, without cutting the center hole and/or without performing any coating of the molded substrate. The uncoated molded substrate is examined optically to locate a center of concentricity for each side using an optical alignment fixture (as will be understood by those of skill in the art). According to one approach as illustrated in FIG. 8A, the position of the center of the data annulus on each side $812a$, $812b$, is measured relative to the center of the outer or inner diameter of the disk 814. If $X_A$ and $Y_A$ represent the orthogonal X and Y distances (in a Cartesian system centered on the mechanical center of the disk) from the mechanical center of the disk, and $X_B$ and $Y_B$ represent orthogonal distances in a Cartesian system of the center of the second side's data annulus from the mechanical center of the disk, then the stamper positions can be corrected by moving the A-side stamper a distance equal to $X_A$ along a first axis and the distance of $Y_A$ along a second, orthogonal, axis while the position of the second (B-side) stamper is corrected by moving the second stamper a distance of $X_B$ along the first axis and a distance of $Y_B$ along the second axis.

Figure 8B:
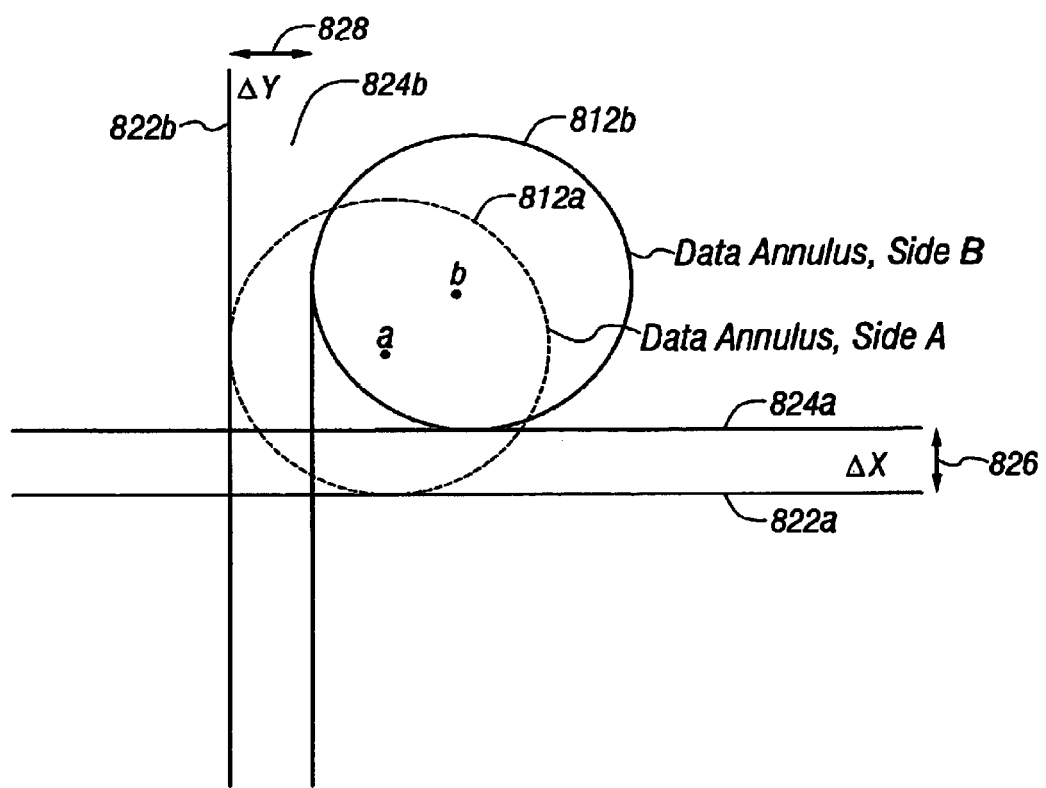
FIG. 8B depicts use of the system of FIG. 8A to obtain positioning correction values, according to an embodiment of the present invention.

Another approach, as illustrated in FIG. 8B may be of use, e g. in cases where it is difficult to estimate the mechanical OD or ID center. In the approach illustrated in FIG. 8B, X and Y tangential axes to the data annulus for first and second sides are determined $822a,b$, $824a,b$. The distance between the axes 826, 828 define $\Delta X$ and $\Delta Y$ values, as depicted. The stamper is then repositioned. The first A-side stamper is repositioned by moving the stamper a distance equal to $\Delta Y/2$ along the X-axis, in a first direction and a distance equal to $\Delta X/2$, along the Y axis, in a second direction. The second stamper is moved a distance equal to $\Delta Y/2$, along the X axis in a third direction, opposite to the first direction, and is moved in an amount equal to $\Delta X/2$, along the Y axis, in a fourth direction, opposite to the second direction.

After locating one or both of the stampers, using the correction factors 1124, the process is preferably iterated 1126, producing additional replicas which are measured to calculate further stamper positioning, until concentricity is found to be within specifications, at which time production operation can begin 1128.

In some embodiments, the concentricity can be at least partially adjusted by providing hubs for the disk which are separately located and registered on the first and second sides. In various embodiments, positioning hubs can be used in addition to adjusting stamper positions for increasing concentricity, or in place of stamper positioning (i.e., as substantially the sole means for obtaining desired concentricity).

In at least some embodiments, such as embodiments providing a magnetic hub (e.g., as described in U.S. patent application Ser No. 09/560,781, filed Apr. 28, 2000, entitled "Miniature Optical Disk for Data Storage," supra), a center hole may not be needed, since the hubs are positioned on the disks to define the center of the disk (i.e., the rotation axis for at least one side) at the individual centers of the data annulus and glued, or otherwise fixed in place. In some embodiments, each side of the disk is provided with marks indicating the center of concentricity of the data pattern for that side, with the marks being used to position the hubs in the desired locations. The marks can be formed during the stamping process (such as being formed by features in the respective stampers) and/or can be formed after the stamping process, e.g., by a (preferably automatic) optical analyzer which locates the center of the data pattern for each side.

Figure 9C:
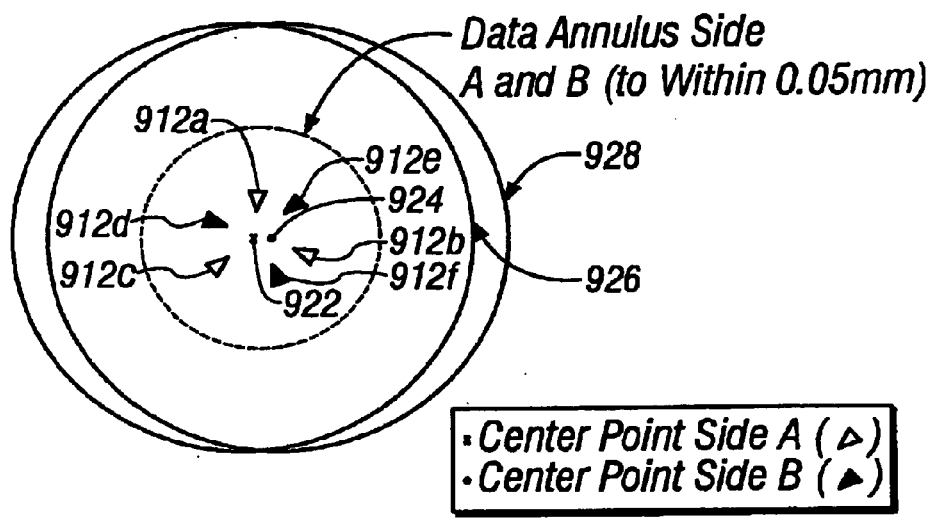
FIG. 9C is a top plan view, with bottom marks shown in phantom, according to an embodiment of the present invention.
Figure 10A:
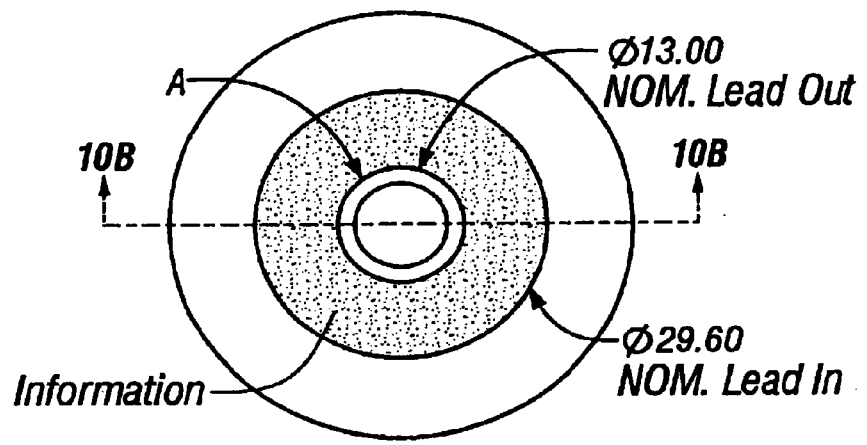
FIGS. 10A,B,C and D are plan and cross-sectional views of punch side and fill side stampers according to an embodiment of the present invention.
Figure 10B:
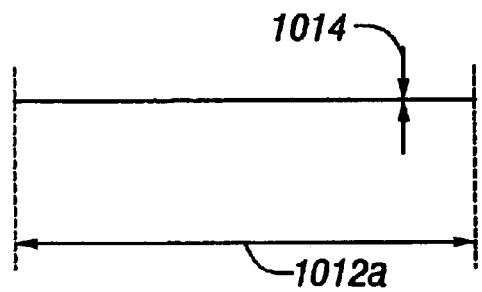
Figure 10C:
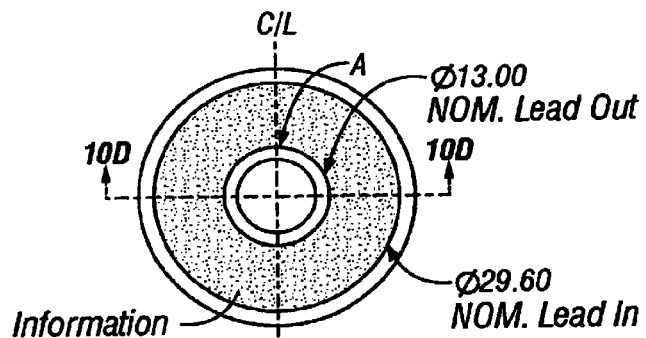
Figure 10D:
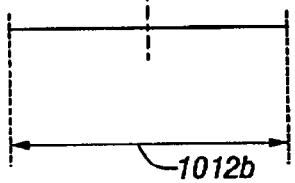
Figure 12:
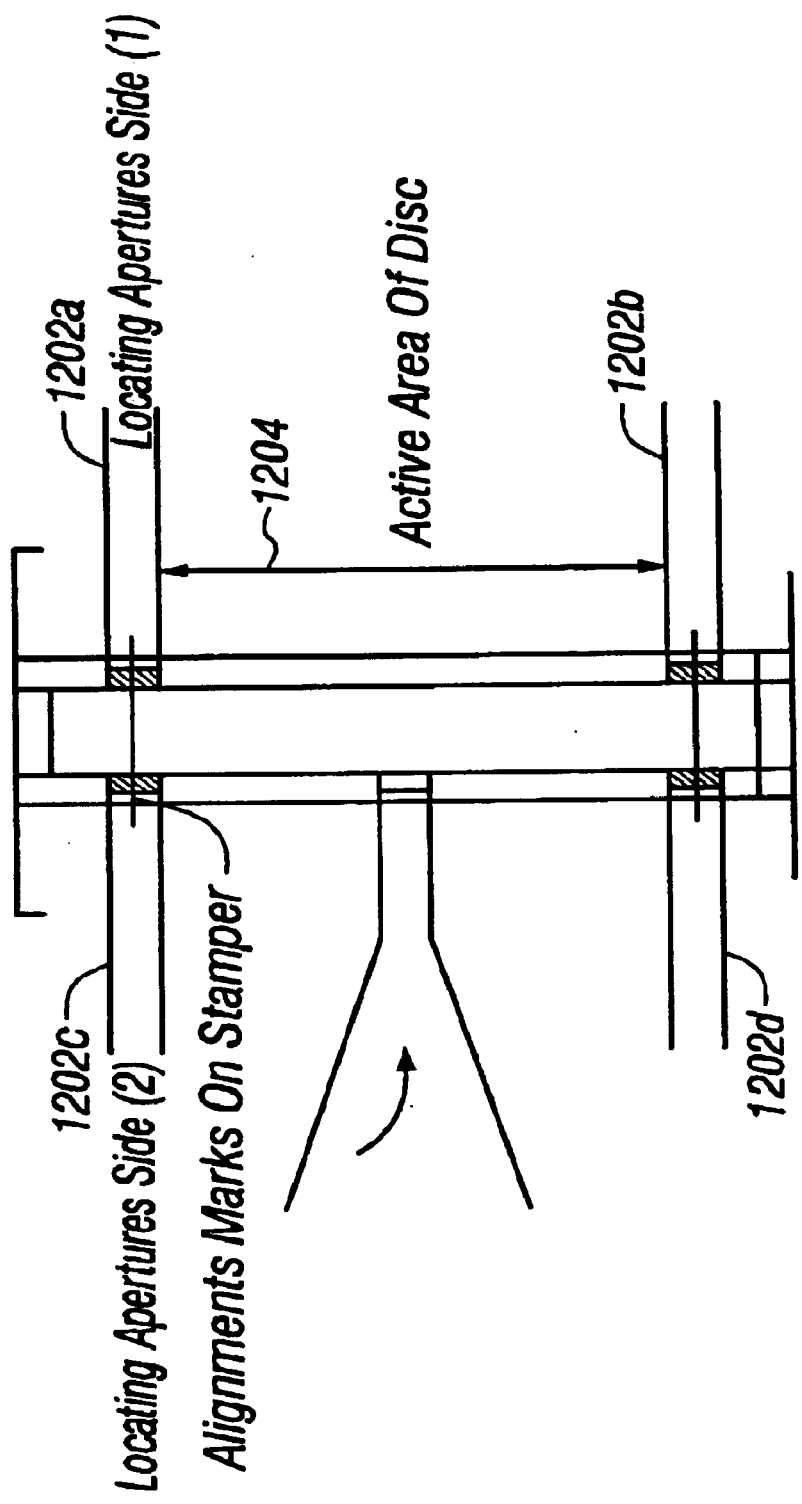
FIG. 12 is a cross-sectional view showing stamper surface alignment using alignment locating operators, according to an embodiment of the present invention.
Figure 13A:
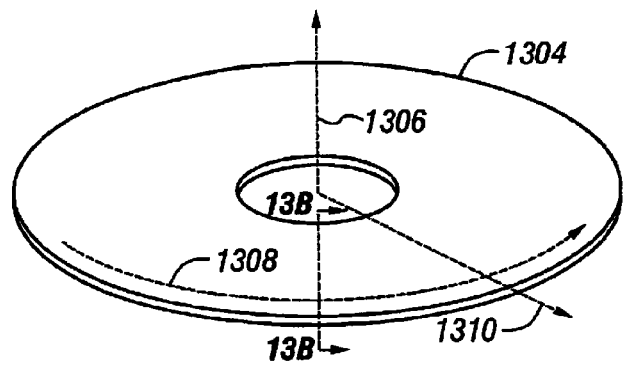
FIGS. 13A,B,C are perspective, cross-sectional and partial enlarged perspective view of a surface of an optical disk according to an embodiment of the present invention.
Figure 13B:
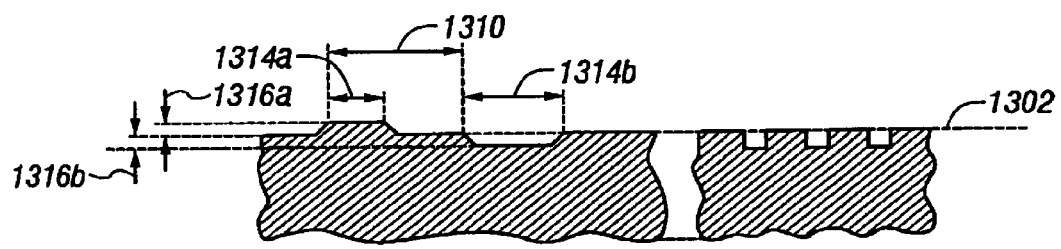
Figure 13C:
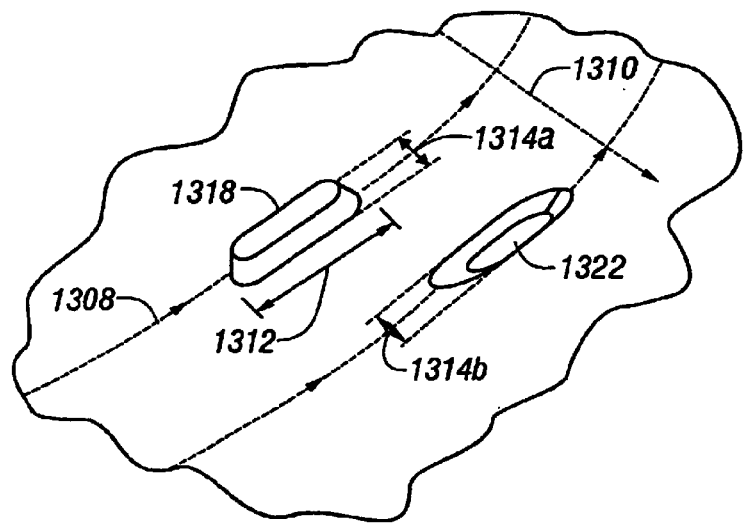

In one embodiment, registration of the data patterns on opposite sides of the disk is facilitated using fiduciary registration marks or apertures, e.g., in the stampers. In at least some embodiments this will involve providing corresponding holes or apertures in the mold body (e.g. for providing viewing ports and/or areas for laser beams or other alignment aids) 1202a,b,c,d (FIG. 12). Although FIG. 12 depicts alignment marks or apertures outside of the data annulus 1204, it is also possible to provide locating marks or apertures 912a,b,c,d,e,f within the inner diameter of the data pattern annulus, as depicted in FIGS. 9a and 9b. The fiduciary marks can take the form, e.g. of alignment registration apertures on the stamper surfaces, each pointing to or indicating the center of the data patterns 914a,b, which may be different from the center of the outside diameters 916a,b. When the stampers are placed into the mold, the stamper positions can be adjusted until the center point 922, indicated by thd fiduciary marks 912a,b,c, of a first stamper is sufficiently close (e.g., within about 35 micrometers, or some other tolerance) to the center point 924 indicated by the fiduciary marks 912d,e,f of the second stamper such that concentricity deviations, side to side, are within desired tolerances (even though this may mean that the outside diameter of the stamper for the first side 926 is displaced from the outside diameter of the stamper for the second side 928 (FIG. 9C)). FIG. 9D shows detail of a center key.

In one embodiment, rather than having to cut a single center hole which defines the same center of rotation for both sides of the disk, each side of the disk can be inscribed with one or more keys or sets of locating apertures that are positioned independent to each other but are located to allow each side of the disk to be independently hubbed so as to be within the concentricity tolerance specification. In another but related embodiment, the independent keyed apertures for each side are configured to receive fingers of a spindle, so that there is a different axis of rotation for each side of the disk.

In light of the above description, a number of advantage of the present invention can be seen. The present invention can provide a digital optical disk having more than one data layer with small replicated features, without the need for laminating two components or disks together. The present invention can provide relatively high productivity and cost effectiveness of a molding process, at least because two data surfaces are molded at the same time, generally providing a doubling of molding process effectiveness. Additionally, prior to the molding process, there is an amount of setup (including stamper positioning). The present invention provides an opportunity to perform only one setup process per disk, compared with at least two in typical laminate disk approaches, potentially providing savings in time, effort and funds. The present invention avoids the potential for delamination, and thus results in a disk having increased reliability. The present invention avoids the risk of imbalance or non-parallelism that can arise during a lamination process and can avoid a need for post-fabrication adjustment of balance and the like. It is believed that use of first surface technology can contribute to the ability to perform double-sided molding, in a practical fashion, in a number of ways. First surface technologies are achieved in the absence of a need for providing interior or buried data layers (such as may be found in DVD disks) thus making it possible to use both surfaces exterior of a molded disk. First surface technologies can achieve relatively high data densities (e.g., as described in as described in U.S. patent application Ser. No. 09/315,398, filed May 20, 1999, entitled "Removable Optical Storage Device and System," and/or U.S. patent application Ser. No. 09/560,781, filed Apr. 28, 2000, entitled "Miniature Optical Disk for Data Storage," supra) such that disks with a relatively small outer diameter (such as about 50 mm or less) can provide storage capacities similar to that of larger-diameter disks (particularly when two or more layers are available) which further enhances the feasibility of double-sided molding (as discussed above in connection with FIG. 5). The present invention allows the production of double-sided, high capacity digital optical disks without the need for injection-compression molding and accordingly provides easier and less expensive processing, compared to injection-compression molding.

A number of variations and modifications of the invention can be used. The invention can be used to provide disks having prerecorded content on one or both sides, and/or features for enabling recording on all or part of one or both sides, and/or any combination thereof. Although embodiments have been described in connection with providing first surface disks, it also possible to use some or all features of the present invention in connection with providing non-first surface disks (e g., reading and writing technologies similar to those in connection with CDs, DVDs and the like) Although certain multi-step processes have been described in connection with certain embodiments of the present invention, it is also possible to perform processes in accordance with embodiments of the present invention, which have more, fewer, or different steps than those examples provided herein and/or which perform steps in a different order than those described or illustrated. Although, according to some embodiments, molding is achieved in the complete absence of compression (with or following injection), in other embodiments, it is possible to provide a method and apparatus which involves a reduced amount of compression (compared to standard injection compression systems)

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e g. for improving performance, achieving ease and\or reducing cost of implementation The present invention includes items which are novel, and terminology adapted from previous and/or analogous technologies, for convenience in describing novel items or processes, do not necessarily retain all aspects of conventional usage of such terminology. Disks made in accordance with embodiments of the present invention can be used for a number of purposes and/or can be played or recorded using a number of devices, including storing data for use by computers such as personal computers, laptops, work stations and the like, storage for music or other audio purposes, including storage for players for compressed musical data, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the storage system and/or medium of the present invention in a wide variety of devices, e.g. to provide for ease of sharing, storing or transmitting of data, e.g. between platforms including, but not limited to devices for play-back, communication or reproduction of data (including, e.g. image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for producing a digital optical disk which has first and second sides, the method comprising:
   positioning first and second stampers, said first and second stampers defining first and second stamper planes, said positioning resulting in said first and second stamper planes being a first distance apart, said first stamper having first stamper marks at least partially out of said first stamper plane, said second stamper having second stamper marks at least partially out of said second stamper plane;
   injecting an initially fluid molding material between said first and second stampers, wherein said molding material substantially fills at least a region having a first diameter;
   wherein said molding material at least partially hardens to provide a first disk with a first side embossed with at least first disk marks corresponding to said first stamper marks and a second side embossed with at least second disk marks corresponding to said second stamper marks, said first and second embossed sides being produced substantially simultaneously;
   positioning said first and second stamper such that said first and second stamper planes are a second distance apart, greater than said first distance;
   removing said first disk from between said first and second stampers;
   determining a concentricity of said first and second sides of said first disk;
   based on said determination, re-positioning said first and second stampers;
   re-injecting an initially fluid molding material between said re-positioned first and second stampers, wherein said molding material substantially fills at least the region having a first diameter;
   wherein said re-injected molding material at least partially hardens to provide a second disk with a first side embossed with at least first disk marks corresponding to said first stamper marks and a second side embossed with at least second disk marks corresponding to said second stamper marks, said first and second embossed sides of said second disk being produced substantially simultaneously and having reduced concentricity compared to said first disk; and
   wherein said first disk marks are readable by providing light to said first side without said light first passing through said second side and wherein said second disk marks are readable by providing light to said second side without said light first passing through said first side.

2. A method, as claimed in claim 1, wherein at least some of said first and second disk marks encode content.

3. A method, as claimed in claim 1, wherein at least some of said first and second disk marks can be used for tracking or navigation.

4. A method, as claimed in claim 1 wherein said first distance is less than about 1.2 mm.

5. A method, as claimed in claim 1 wherein said first distance is less than about 0.6 mm.

6. A method, as claimed in claim 1 wherein said diameter is less than about 50 mm.

7. A method, as claimed in claim 1 wherein said disk is formed in the absence of a step of compression after said injection.

8. A method, as claimed in claim 1 further comprising compressing said molding material after said injection.

9. A method, as claimed in claim 1 wherein at least some of said first marks have a depth greater than about 60 nanometers.

10. A method, as claimed in claim 1 wherein at least some of said first marks have a depth greater than about 80 nanometers.

11. A method, as claimed in claim 1 wherein at least some of said first marks have depth greater than about 90 nanometers.

12. A method, as claimed in claim 1 wherein said molding material comprises a polycarbonate resin.

13. A method, as claimed in claim 1 further comprising providing at least a first coating over at least part of said disk.

14. A method, as claimed in claim 1 further comprising sputtering a coating over at least part of said disk.

15. A method, as claimed in claim 1 further comprising coupling a hub to said disk.

16. A method as claimed in claim 1 further comprising adjusting a lateral position of said first stamper with respect to said second stamper.

17. A method for producing a digital optical disk which has first and second sides, the method comprising:
   positioning first and second stampers, said first and second stampers defining first and second stamper planes, said positioning resulting in said first and second stamper planes being a first distance apart, said first stamper having first stamper marks at least partially out of said first stamper plane, said second stamper having second stamper marks at least partially out of said second stamper plane;

injecting an initially fluid molding material between said first and second stampers, wherein said molding material substantially fills at least a region having a first diameter;

wherein said molding material is least partially hardens to provide a first disk with a first side embossed with at least first disk marks corresponding to said first stamper marks and a second side embossed with at least second disk marks corresponding to said second stamper marks, said first and second embossed sides being produced substantially simultaneously;

positioning said first and second stamper such that said first and second stamper planes are a second distance apart, greater than said first distance;

removing said first disk from between said first and second stampers;

wherein said first disk marks are readable by providing light to said first side without said light first passing through said second side and wherein said second disk marks are readable by providing light to said second side without said light first passing through said first side; adjusting a lateral position of said first stamper with respect to said second stamper, said adjusting including comparing concentricity of said first and second sides and moving at least a first of said stampers; and re-injecting an initially fluid molding material between said adjusted first and second stampers, wherein said molding material substantially fills at least the region having a first diameter;

wherein said re-injected molding material at least partially hardens to provide a second disk with a first side embossed with at least first disk marks corresponding to said first stamper marks and a second side embossed with at least second disk marks corresponding to said second stamper marks, said first and second embossed sides being produced substantially simultaneously.

18. A method, as claimed in claim 1 wherein said molding material has volume resistivity less than about 105 ohm-cm.

* * * * *